(12) United States Patent
Marvi et al.

(10) Patent No.: US 12,434,381 B2
(45) Date of Patent: Oct. 7, 2025

(54) ELECTROMAGNETICALLY ACTUATED SOFT ROBOTIC DEVICES AND METHODS FOR THEIR FABRICATION

(71) Applicants: Hamidreza Marvi, Chandler, AZ (US); Elizabeth Skowronek, Tempe, AZ (US); Reza James Ahmed, Tempe, AZ (US); Mahdi Ilami, Tempe, AZ (US)

(72) Inventors: Hamidreza Marvi, Chandler, AZ (US); Elizabeth Skowronek, Tempe, AZ (US); Reza James Ahmed, Tempe, AZ (US); Mahdi Ilami, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 975 days.

(21) Appl. No.: 17/521,388

(22) Filed: Nov. 8, 2021

(65) Prior Publication Data

US 2022/0143817 A1   May 12, 2022

Related U.S. Application Data

(60) Provisional application No. 63/111,493, filed on Nov. 9, 2020.

(51) Int. Cl.
*H01H 9/00* (2006.01)
*B25J 9/16* (2006.01)
*H01F 7/06* (2006.01)
*H01F 7/08* (2006.01)
*H01H 47/00* (2006.01)
(Continued)

(52) U.S. Cl.
CPC .............. *B25J 9/161* (2013.01); *H01F 7/064* (2013.01); *H01F 7/081* (2013.01)

(58) Field of Classification Search
CPC .......... B25J 9/161; H01F 7/064; H01F 7/081; A61F 2/70
USPC .......................................... 361/160; 310/306
See application file for complete search history.

(56) References Cited

U.S. PATENT DOCUMENTS

2012/0031218 A1\* 2/2012 Galloway ............ B62D 57/032
901/1
2014/0115944 A1\* 5/2014 Thomas ................. A01K 85/01
43/4.5
(Continued)

OTHER PUBLICATIONS

Ahmed, R. et al., "A ShapeshiftingFerrofluidic Robot," Oct. 2020, https://birth.engineering.asu.edu/wp-content/uploads/2021/02/Ferromoebot-Final-Version-Soft-Robotics-1.pdf, 20 pages.
(Continued)

*Primary Examiner* — Sean Kayes
*Assistant Examiner* — Lucy M Thomas
(74) *Attorney, Agent, or Firm* — Withrow & Terranova, PLLC

(57) ABSTRACT

An electromagnetically actuated robotic device comprises electromagnetic coils, a charge storage element, at least one processor, a plurality of electrically conductive paths, optionally in combination with sensor(s), all arranged in, and/or on, an elastomeric body structure. Shape, gait, and/or electrical properties shape of a robotic device may be altered by selective actuation of one or more electromagnetic coils. Methods for fabricating and using such devices are also provided.

14 Claims, 17 Drawing Sheets

(51) Int. Cl.
*H01H 51/22* (2006.01)
*H01H 51/30* (2006.01)

(56) References Cited

U.S. PATENT DOCUMENTS

2014/0273714 A1* 9/2014 Leyland ............... A63H 33/26
 336/105
2017/0239821 A1* 8/2017 Lessing .................. B25J 15/12

OTHER PUBLICATIONS

Bodaghi, M. et al., "4D Printing Self-Morphing Structures," Materials, vol. 12, No. 8, Apr. 2019, MDPI, 17 pages.
De Marco, C. et al., "4D printing and robotics," vol. 3, No. 18, May 2018, 3 pages.
Drotman, D. et al., "3D printed soft actuators for a legged robot capable of navigating unstructured terrain," 2017 EEE International Conference on Robotics and Automation (ICRA), May 29-Jun. 3, 2017, Singapore, IEEE, 7 pages.
Gul, J. et al., "3d printing for soft robotics—a review," Science and Technology of Advanced Materials, vol. 19, No. 1, Mar. 2018, National Institute for Materials Science, 21 pages.
Han, D. et al., "Soft Robotic Manipulation and Locomotion with a 3D Printed Electroactive Hydrogel," ACS Applied Materials & Interfaces, vol. 10, No. 21, May 2018, American Chemical Society, 18 pages.
Ilami, M. et al., "Magnetically Actuated Tunable Soft Electronics," ACS Omega, Dec. 2019, American Chemical Society, 9 pages.
Joyee, E. et al., "A Fully Three-Dimensional Printed Inchworm-Inspired Soft Robot with Magnetic Actuation," Soft Robotics, vol. 6, No. 3, Jun. 2019, 13 pages.
Kotikian, A. et al., "Untethered soft robotic matter with passive control of shape morphing and propulsion," Science Robotics, vol. 4, No. 33, Aug. 2019, 11 pages.
Lazarus, N. et al., "Ferrofluid-based Stretchable Magnetic Core Inductors," PowerMEMS 2015, Journal of Physics: Conference Series 660, Dec. 2015, IOP Publishing, 5 pages.
Lum, G.Z. et al., "Shape-programmablemagnetic soft matter," Proceedings of the National Academy of Sciences, Sep. 2016, 9 pages.
Marvi, H. et al., "Opportunities and Challenges in Soft Robotics," Advanced Intelligent Systems, vol. 2, No. 6, Jun. 2020, Wiley-VCH Verlag Gmbh & Co., 2 pages.
Rus, D. et al., "Design, fabrication and control of soft robots," Nature, vol. 521, May 28, 2015, Macmillan Publishers Limtied, 9 pages.
Schiller, L. et al., "Toward a Gecko-Inspired, Climbing Soft Robot," Frontiers in Neurorobotics, vol. 13, No. 106, Dec. 2019, 9 pages.
Shih, B. et al., "Design Considerations for 3D Printed, Soft, Multimaterial Resistive Sensors for Soft Robotics," Frontiers in Robotics and AI, vol. 6, Article 30, Apr. 2019, 12 pages.
Wen, L. et al., "Understanding Fish Linear Acceleration Using an Undulatory Biorobotic Model with Soft Fluidic Elastomer Actuated Morphing Median Fins," Soft Robotics, vol. 5, No. 4, Aug. 2018, 14 pages.
Yirmibesoglu, O.D. et al., "Direct 3D printing of silicone elastomer soft robots and their performance comparison with molded counterparts," 2018 IEEE International Conference on Soft Robotics (RoboSoft), Apr. 24-28, 2018, Livorno, Italy, IEEE, pp. 295-302.
Zhang, Y.F. et al., "Fast-Response, Stiffness-Tunable Soft Actuator by Hybrid Multimaterial 3D Printing," Advanced Functional Materials, vol. 29, Apr. 2019, WILEY-VCH Verlag Gmbh & Co., 9 pages.

* cited by examiner

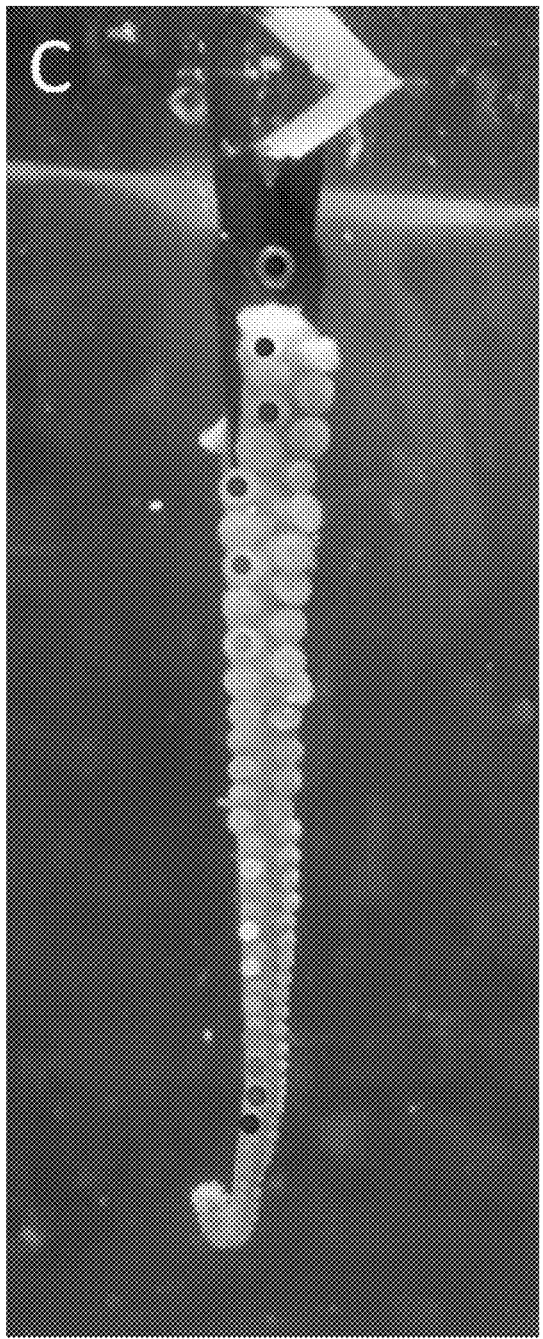 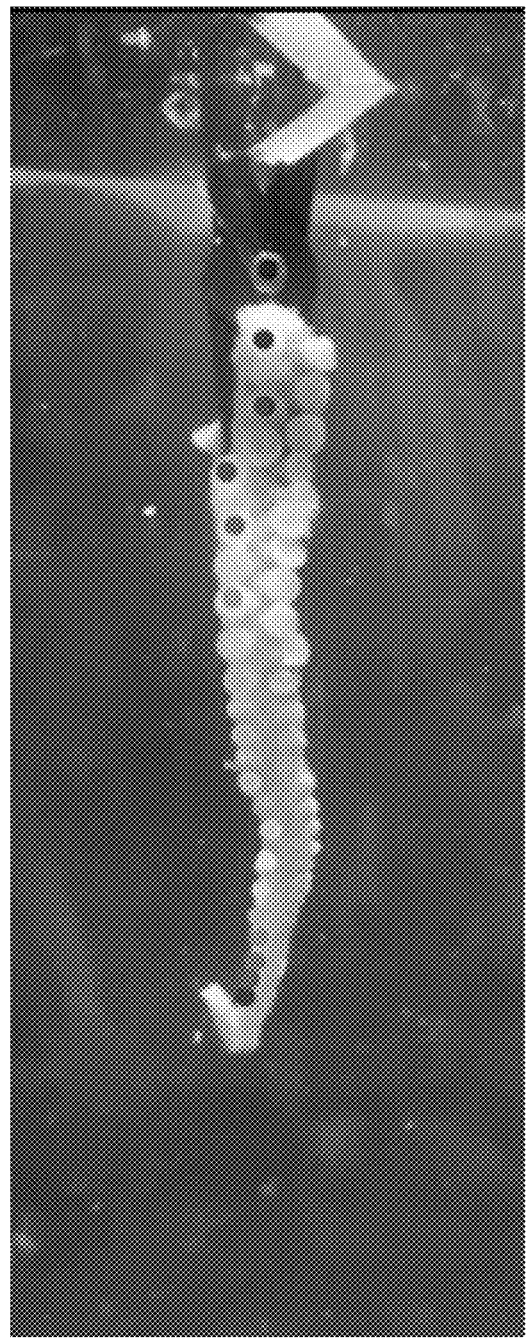
*FIG. 23A*  *FIG. 23B*

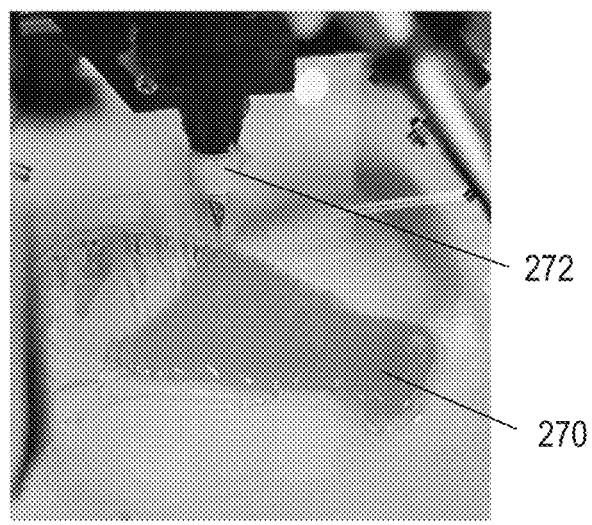
FIG. 24
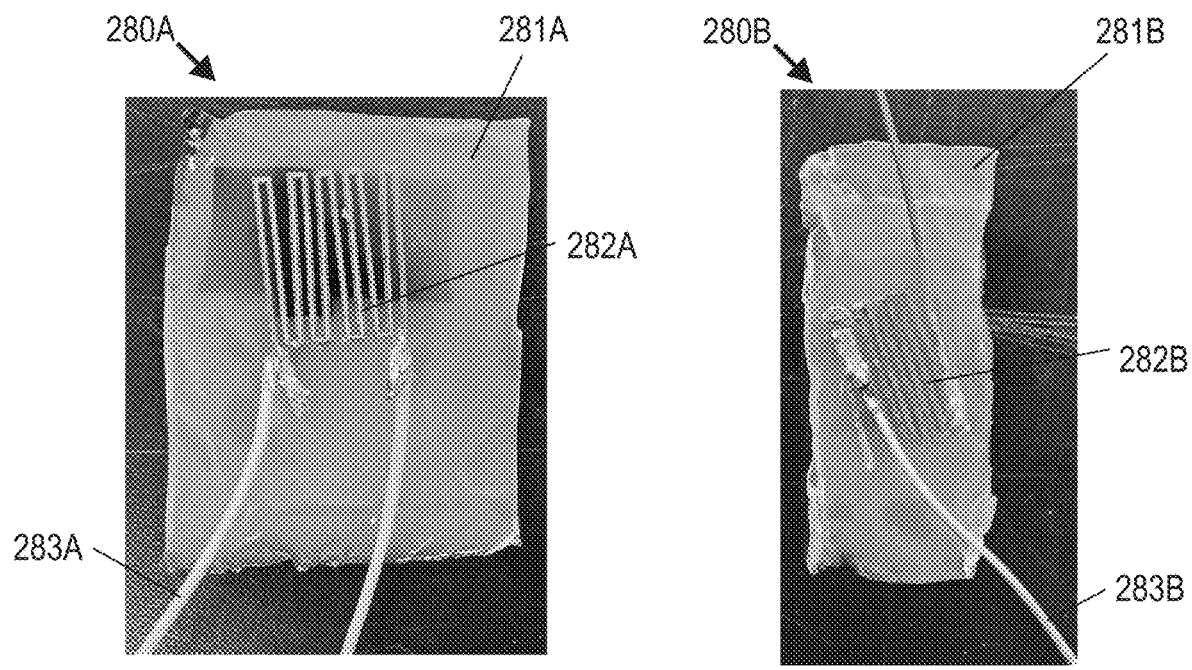
FIG. 25     FIG. 26

ELECTROMAGNETICALLY ACTUATED SOFT ROBOTIC DEVICES AND METHODS FOR THEIR FABRICATION

CROSS-REFERENCE TO RELATED APPLICATION(S)

This application claims priority to U.S. Provisional Patent Application No. 63/111,493 filed on Nov. 9, 2020, wherein the entire contents of the foregoing application are hereby incorporated by reference herein.

TECHNICAL FIELD

This disclosure relates to robotic devices, including robotic devices with non-rigid body structures and that may be subject to morphological and/or functional adaptations to facilitate performance of manipulation, sensing, and/or locomotion tasks.

BACKGROUND

Bioinsipred soft robotics is a rapidly growing field that has introduced exciting opportunities to create machines with unprecedented functionalities[i,ii,iii,iv]. Although this field originated from nature, there are many shortcomings facing soft robots that hinder their ability to achieve some of the highly enabling functionalities demonstrated by their biological counterparts. Particularly, the ability to make morphological and gait adaptations allows animals such as lizards and snakes to effectively traverse a wide range of complex flowable environments[v,vi,vii]. For instance, sandfish can swiftly run on sand using a quadrupedal gait and effortlessly swim under the sand through body undulations and without using limbs[5]. However, current soft robots usually cannot make such adaptations on the fly[1,viii]. Need exists in the art for soft robotic devices that address limitations associated with conventional devices.

SUMMARY

This disclosure introduces a new class of soft robots with new transformative functionalities: altering their morphology (e.g., number and location of limbs), transforming their gait (e.g., by altering both morphology and actuation patterns), and/or altering (e.g., tuning) their electrical properties in real-time, by selective actuation of one or more electromagnetic coils arranged in or on an elastomeric body structure, with the body structure further comprising a charge storage element, at least one processor, and a plurality of electrically conductive paths.

In one aspect, the disclosure relates to an electromagnetically actuated robotic device that comprises: a plurality of electromagnetic coils arranged in (e.g., inside) or on the elastomeric body structure; a charge storage element arranged in or on the elastomeric body structure; at least one processor arranged in or on the elastomeric body structure; and a plurality of electrically conductive paths within the elastomeric body structure. The electrically conductive paths extend between the charge storage element, the at least one processor, and the plurality of electromagnetic coils. At least one of (i) shape, (ii) gait, or (iii) electrical properties of the magnetically actuated robotic device may be altered by selective actuation of one or more electromagnetic coils of the plurality of electromagnetic coils.

In certain embodiments, the electromagnetically actuated robotic device further comprises at least one magnetically responsive element arranged in or on the elastomeric body structure.

In certain embodiments, the one or more electromagnetic coils comprises a plurality of electromagnetic coils.

In certain embodiments, one or more electromagnetic coils of the plurality of electromagnetic coils has an associated magnetically responsive core.

In certain embodiments, a magnetically responsive core associated with one or more electromagnetic coils comprises a ferrofluid or a liquid metal.

In certain embodiments, a magnetically responsive core associated with one or more electromagnetic coils comprises an electrically conductive particulate material or a magnetically responsive polymer.

In certain embodiments, two or more of (i) shape, (ii) gait, or (iii) electrical properties of the magnetically actuated robotic device may be altered by selective actuation of one or more electromagnetic coils of the plurality of electromagnetic coils.

In certain embodiments, each one of (i) shape, (ii) gait, and (iii) electrical properties of the magnetically actuated robotic device may be altered by selective actuation of one or more electromagnetic coils of the plurality of electromagnetic coils.

In certain embodiments, the elastomeric body structure comprises a plurality of fused dots, rods, or layers.

In another aspect, the disclosure relates to a method for fabricating an electromagnetically actuated robotic device, the method comprising: forming a first portion of an elastomeric body structure; providing a first plurality of electromagnetic coils in or on the first portion of the elastomeric body structure; depositing a conductive material in or on the first portion of the elastomeric body structure to provide a first plurality of conductive paths coupled with the first plurality of magnetic coils; forming a second portion of the elastomeric body structure; providing at least one processor in or on the first portion and/or the second portion of the elastomeric body structure, and coupling the at least one processor with at least one conductive path of the first plurality of conductive paths; and providing a charge storage element in or on the first portion and/or the second portion of the elastomeric body structure, and coupling the charge storage element with at least one conductive path of the first plurality of conductive path.

In certain embodiments, the method further comprises: providing a second plurality of electromagnetic coils in or on the second portion of the elastomeric body structure; depositing conductive material in or on the second portion of the elastomeric body structure to provide a second plurality of conductive paths coupled with the second plurality of magnetic coils; coupling the at least one processor with at least one conductive path of the second plurality of conductive paths; and coupling the charge storage element with at least one conductive path of the second plurality of conductive paths.

In certain embodiments, the forming of one or more of the first portion of the elastomeric body structure or the forming of the second portion of the elastomeric body structure comprises three-dimensional printing.

In certain embodiments, the forming of one or more of the first portion of the elastomeric body structure or the forming of the second portion of the elastomeric body structure comprises molding.

In certain embodiments, the depositing of conductive material in or on the first portion of the elastomeric body structure comprises three-dimensional printing.

In certain embodiments, the providing of the first plurality of electromagnetic coils in or on the first portion of the elastomeric body structure comprises three-dimensional printing.

In certain embodiments, for at least one electromagnetic coil of the plurality of electromagnetic coils, the method further comprises forming a magnetically responsive core associated with the at least one electromagnetic coil.

In certain embodiments, for the at least one electromagnetic coil, the magnetically responsive core comprises a ferrofluid or a liquid metal.

In certain embodiments, for the at least one electromagnetic coil, the magnetically responsive core comprises an electrically conductive particulate material or a magnetically responsive polymer.

In certain embodiments, at least one of (i) shape, (ii) gait, or (iii) electrical properties of the magnetically actuated robotic device may be altered by selective actuation of one or more electromagnetic coils of the plurality of electromagnetic coils.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF DRAWINGS

FIGS. 23A-23B are photographs of an electromagnetically actuated robotic device resembling an octopus tentacle in first and second actuation states, respectively, with the second actuation state being contracted relative to the first actuation state.

FIG. 24 is a photograph showing a 3D print head being used to fabricate a fish-shaped electromagnetically actuated robotic soft device comprising silicone rubber and resembling a fish.

FIGS. 25 and 26 are photographs of at least portions of electromagnetically actuated robotic soft devices each comprising silicone rubber and a conductive circuit, produced by a 3D printing apparatus as described herein.

DETAILED DESCRIPTION

Figure 1:
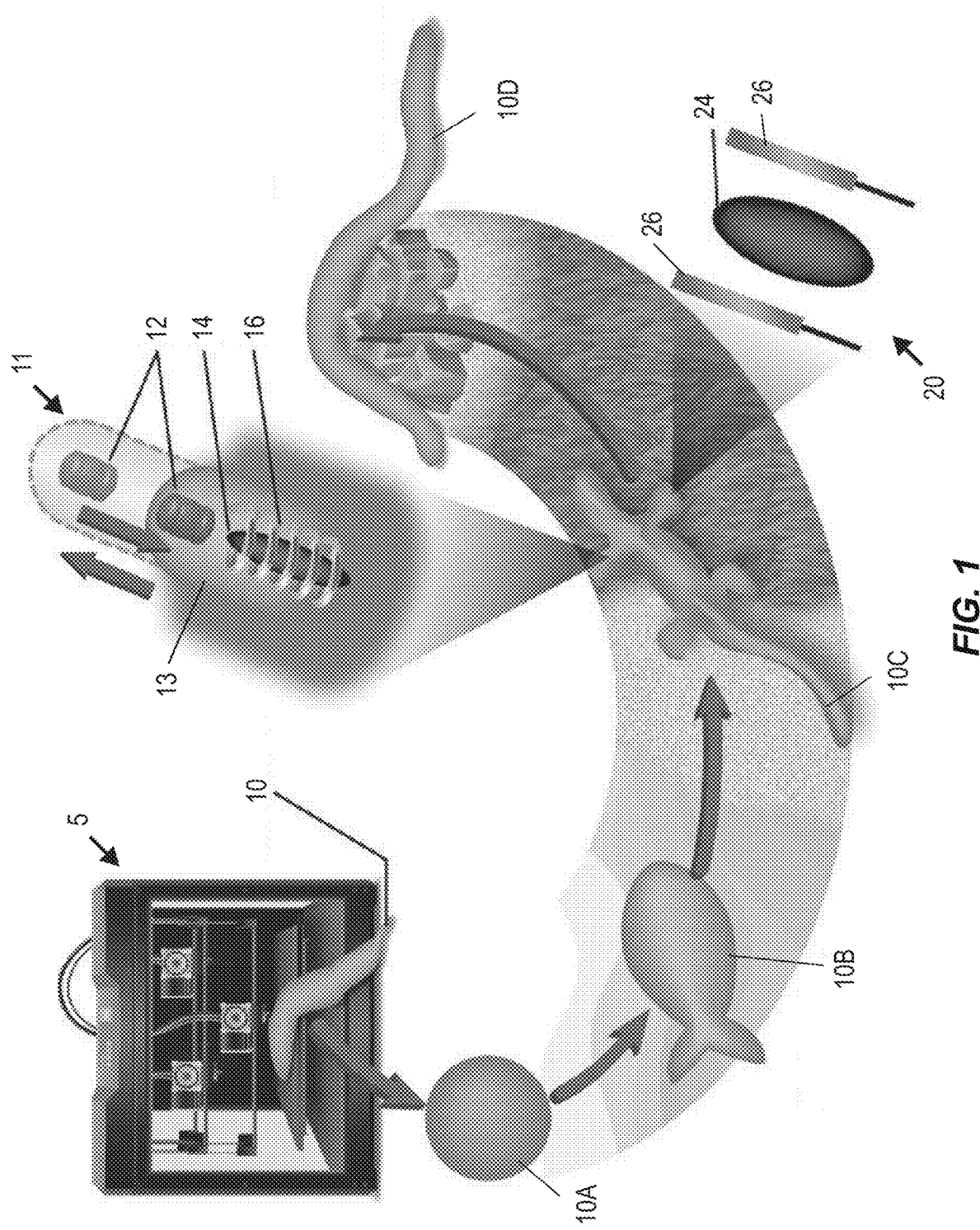
FIG. 1 is a schematic diagram depicting the fabrication of an electromagnetically actuated robotic device by multi-material 3D printing, with the robotic device including tunable magnetic actuators, tunable capacitive pressure sensors, and programmable morphology such as to enable swimming, crawling, and/or navigation of uneven terrain.

Electromagnetically actuated robotic devices and methods for their fabrication are provided herein. In certain embodiments, a plurality of electromagnetic coils is arranged in or on the elastomeric body structure; a charge storage element is arranged in or on the elastomeric body structure; at least one processor is arranged in or on the elastomeric body structure; and a plurality of electrically conductive paths are provided within the elastomeric body structure. Electromagnetically actuated robotic devices provided herein allow for numerous transformative functionalities, such as altering morphology, transforming gait, and tuning of electrical properties in real-time. Such robotic devices may also include embedded sensors and actuators.

In certain embodiments, electromagnetically actuated robotic devices are highly deformable and are capable of morphing from a printed shape into any desired form. Altering morphology and gait can be achieved through the controlled interactions of embedded printable electromagnets and magnetic materials. In particular, different parts of the body can be pulled, pushed, bent, or twisted due to internal interactions and thus the morphology and gait can be modified Rapid prototyping techniques may be used for direct printing (e.g., three-dimensional printing) of electromagnetically actuated soft robotic devices incorporating with magnetic, conductive, and fluidic components. In certain embodiments, actuation and sensing elements of electromagnetically actuated robotic devices may be modified remotely. Additionally, a model-based reinforcement learning technique may be used to allow for simultaneous optimization of morphology, gait, sensing, and actuation of electromagnetically actuated soft robotic devices.

In certain embodiments, electromagnetically actuated robotic devices disclosed herein may alter their morphology, gait, electronics, sensor properties (e.g. resolution, range, linearity), and/or actuator properties (e.g. field strength and distribution).

In certain embodiments, electromagnetically actuated robotic devices are untethered, with onboard magnetic self-actuation capabilities. Due to this self-actuating design, such devices are capable of functioning outside of a laboratory setting. Actuating and sensing components may be arranged in or on electromagnetically actuated robotic devices, with the properties of each of these components subject to being tuned on-demand and remotely. This makes devices disclosed herein useful for fully autonomous tasks such as terrestrial and aquatic exploration, as well as search and rescue.

The highly deformable and morphing structure of electromagnetically actuated robotic devices disclosed herein caters directly to human interaction, with particular applicability to medical robotics. For example, the soft body and morphing capability of robotic devices disclosed herein may be useful for producing dexterous robotic digits and limbs, wearable devices for rehabilitation, or deformable endoscopes.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As noted above, different parts of an elastomeric body structure of an electromagnetically actuated robotic device can be pulled, pushed, bent, or twisted due to internal interactions, such that morphology and gait of a robotic device can be modified. For example, in the case of a robotic device inspired by a sandfish, the morphology of the robotic device can change from limbed to limbless when transitioning from above a surface to under a surface. Furthermore, the gait can also switch from quadrupedal walking/running to body undulation, allowing the robotic device to smoothly adapt to the new terrain.

In certain embodiments, an electromagnetically actuated robotic device comprises both fixed electrical components (e.g., coils, plates, and resistive elements) and mobile electrical components (e.g., ferrofluid) to permit electrical properties to be tuned. The position and quantity of the mobile electrical components may impact the characteristics of tunable electronic elements, as noted in a recent publication[ix]. By optimizing both the fixed and mobile components of each sensor and actuator, characteristics (e.g., magnetic field strength and distribution for the magnetic actuators and sensitivity, resolution, and linearity for sensors) may be tuned within a desired range. For example, in certain embodiments using embedded printable electromagnets, ferrofluid droplets associated with electronic components can be repositioned to tune the actuation and sensing components of an electromagnetically actuated robotic device. In certain embodiments, location and characteristics of sensors may be changed in order to modify terrain sensing capabilities.

There are many approaches towards the process of design, modeling, and control of robotic systems. For instance, they may be performed in a sequence such that a morphological structure is first designed based on a set of desired functionalities and prescribed constraints. Next, a physics-based or data-driven model for this particular design can be developed and finally, a model-based controller may be devised for the robot. The modeling step can also be skipped using model-free control strategies. Alternatively, once the morphology is designed, a model and a controller can be learned together for that system using data-driven techniques such as model-based reinforcement learning or Bayesian optimization. However, preferred design, modeling, and control for electromagnetically actuated robotic devices according to various embodiments are all highly coupled and thus, decoupling any of them may result in missing part of the search space. Accordingly, a fully integrated design, modeling, and control approach may be used according to embodiments disclosed herein.

A proposed integrated approach is hierarchical in the sense that there is an outer loop for optimizing an initial "as-printed" design and in each iteration, an optimal morphology, model, and controller should be found. This inner co-learning loop entails the novel contribution of this objective. Accordingly, the first step of the integrated co-learning process is to start with an initial design and then train a model that can incorporate all "behaviors" of an electromagnetically actuated robotic device (morphology, gait, sensing, and actuation). This initial model may then be used to develop a model-based optimal controller, while the model itself is also being optimized through this process. Next, changes may be made to the initial as-printed design and a co-learning process may be re-executed until an optimal initial design is found.

Sample efficiency is an important consideration for data-driven approaches. This is especially the case for electromagnetically actuated robotic devices given the innate reduced durability of soft materials, and thus increased difficulty in obtaining large sample sizes. Model-based reinforcement learning (MBRL) has demonstrated to be significantly more sample efficient than model-free reinforcement learning (MFRL), allowing it to achieve comparable performance metrics to an MFRL network with only a fraction of the training sample count (in some cases taking only 10% of the total training sample count to achieve comparable results). Among state-of-the-art MBRL methods, an algorithm known as PETS (Probabilistic Ensembles with Trajectory Sampling) has been shown to converge faster than competing MBRL algorithms, and is known to provide reasonably good performance without modification. In the PETS model, an array of neural network models parameterize a Gaussian distribution to converge on a dynamics model for use in control approaches. For example, this converged distribution can be used in model predictive control (MPC). At any given time step, several potential future trajectories are predicted and compared with each other. The trajectory that offers the most reward may be chosen from the predicted trajectories to be executed.

MBRL techniques such as PETS are limited in that they can only handle fixed morphology. Research delving into reinforcement learning of robotic gait often considers either an actual or a simulated robot with a single physical and kinematic configuration. Such methods are forced to use an iterative approach to optimize the morphology and gait, since currently these two fundamental aspects of locomotion cannot be optimized together. However, for electromagnetically actuated robotic device according to embodiments disclosed herein a wide range of variables need to be freely available to the neural network for learning, and also be categorized by how they affect different behaviors.

To bridge the knowledge gap in MBRL techniques and enable efficient modeling of electromagnetically actuated robotic devices, a novel MBRL approach simultaneously learns morphology, gait, sensing, and actuation aspects of any initial designs. Optimized meta-learning is applied on a control structure with embedded latent variables: learning to quickly converge on the correct subset of model parameters for the task at hand, within a model framework that includes a large number of possible model parameters that can fully describe the vast problem space. Inspired by Belkale[x], a novel approach involves use of a meta-learning algorithm that is similarly used to learn a model that converges on scenario specific model parameters from a bank of possible model parameters that fully describe the vast problem space.

To incorporate potentially destructive mechanical, chemical, electrical, thermal, or magnetic interactions of different materials into the reward functions and optimization constraints, multi-physics simulations (e.g., exploring interactions of magnetic, electronic, and soft components) may be conducted in COMSOL. For instance, determinations may be made as to how significantly magnetic fields of sensors and actuators interfere, and if additional constraints to a design space may be needed to either decrease or amplify this interaction. Additionally, heat transfer analysis ay be performed to predict and plan for the amounts of heat created by circuitry and electromagnetic coils, and whether this will affect a robotic device and/or its surroundings.

FIG. 1 is a schematic diagram depicting the fabrication of an electromagnetically actuated robotic device 10 by a multi-material 3D printing apparatus 5, wherein the robotic device 10 may be provided in or assume various forms with programmable morphology, including a spherical form 10A, a fish-like form 10B to enable swimming, a lizard-like form 10C to enable crawling, and a worm-like form 10D to enable navigation of uneven terrain. Such a robotic device 10 may comprise one or more tunable magnetic actuators 11 each including an electromagnetic coil 16, optionally paired with a magnetic material 12 and/or a ferrofluid droplet 14, that may move relative to the electromagnetic coil 16, within a soft body structure 13. A robotic device 10 may additionally comprise one or more tunable capacitive pressure sensors 20 that may include a moveable magnetic material 24 (e.g., a ferrofluid droplet) arranged between conductive elements 26 (e.g., plates).

Figure 2:
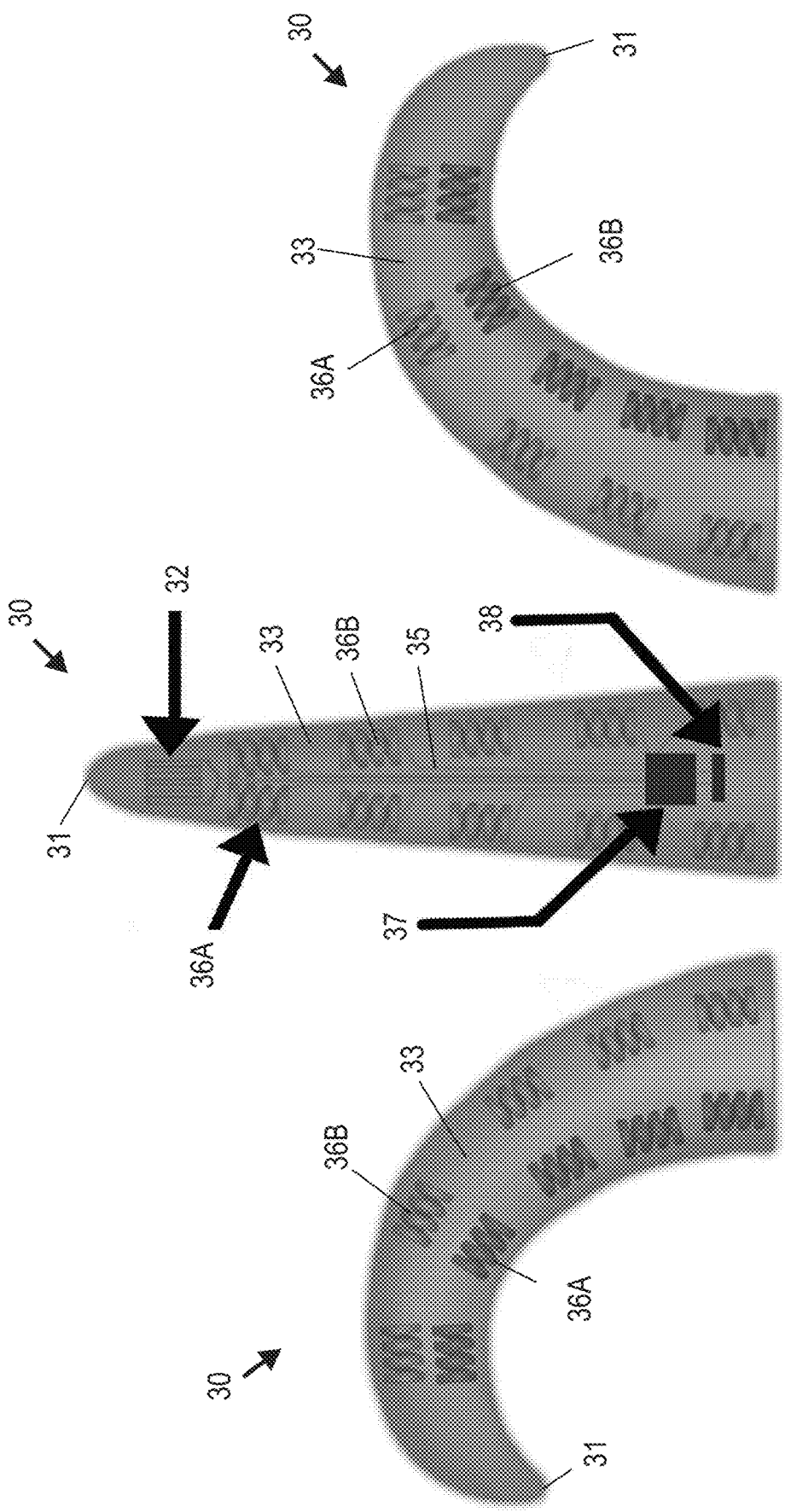
FIG. 2A is a schematic diagram depicting an electromagnetically actuated robotic device according to one embodiment, the robotic device comprising an elastomeric body structure, microcontroller, a battery, a pressure sensor, multiple electromagnetic coils arranged in two (left and right) rows, and multiple electrically conductive paths within the elastomeric body structure extending between the battery, the microcontroller, the electromagnetic coils, and the pressure sensor, with none of the electromagnetic coils in an active state.
FIG. 2B is a schematic diagram depicting the electromagnetically actuated robotic device of FIG. 2A in a state in which the left electromagnetic coils are active (e.g., energized), causing the elastomeric body structure to bend in a leftward direction.
FIG. 2C is a schematic diagram depicting the electromagnetically actuated robotic device of FIG. 2A in a state in which the right electromagnetic coils are active (e.g., energized), causing the elastomeric body structure to bend in a rightward direction.

FIG. 2A is a schematic diagram depicting an electromagnetically actuated robotic device 30 according to one embodiment, the robotic device comprising an elastomeric body structure 33 having a tip 31, a pressure sensor 32 (proximate to the tip 31), a left row of electromagnetic coils 36A, a right row of electromagnetic coils 36B, a microcontroller 37, a battery 38, and multiple electrically conductive paths 35 within the elastomeric body structure 33 extending between the battery 38, the microcontroller 37, the left and right rows of electromagnetic coils 36A, 36B, and the pressure sensor 32. As illustrated, none of the electromagnetic coils 36A, 36B is in an active state, such that the elastomeric body structure 33 is arranged in an uncurved state.

FIG. 2B is a simplified schematic diagram depicting the electromagnetically actuated robotic device 30 of FIG. 2A in a state in which at least some electromagnetic coils of the left row of electromagnetic coils 36A are active (e.g., energized), causing the elastomeric body structure 33 to bend, causing the tip 31 to point in a leftward direction. FIG. 2C is a simplified schematic diagram depicting the electromagnetically actuated robotic device 30 of FIG. 2A in a state in which at least some electromagnetic coils of the right electromagnetic coils 36B are active (e.g., energized), causing the elastomeric body structure 33 to bend, causing the tip 31 to point in a rightward direction.

In certain embodiments, the microcontroller 37 and the battery 38 (or other charge storage element) may be prefabricated, and positioned in or on the elastomeric body structure 33 during fabrication thereof. Electrically conductive paths 35 coupling electromagnetic coils 36A, 36B, sensors 32, processing components 37, and charge storage components 38 may be fabricated concurrently with fabrication of the elastomeric body structure 33, by techniques such as multi-material three-dimensional printing. Alternatively, or additionally, various electrical components including electromagnetic coils 36A, 36B and/or conductive paths 35 (e.g., filaments or traces) may be pre-formed, and an elastomeric body structure 33 may be produced by molding, 3D printing, and/or any other suitable technique. In certain embodiments, electrically conductive paths 35 may comprise metals, conductive polymers, or conductive composite materials. In certain embodiments, a microcontroller 37 incorporated into an electromagnetically activated robotic device 30 may include one or more processors and at least one memory.

Figure 3:
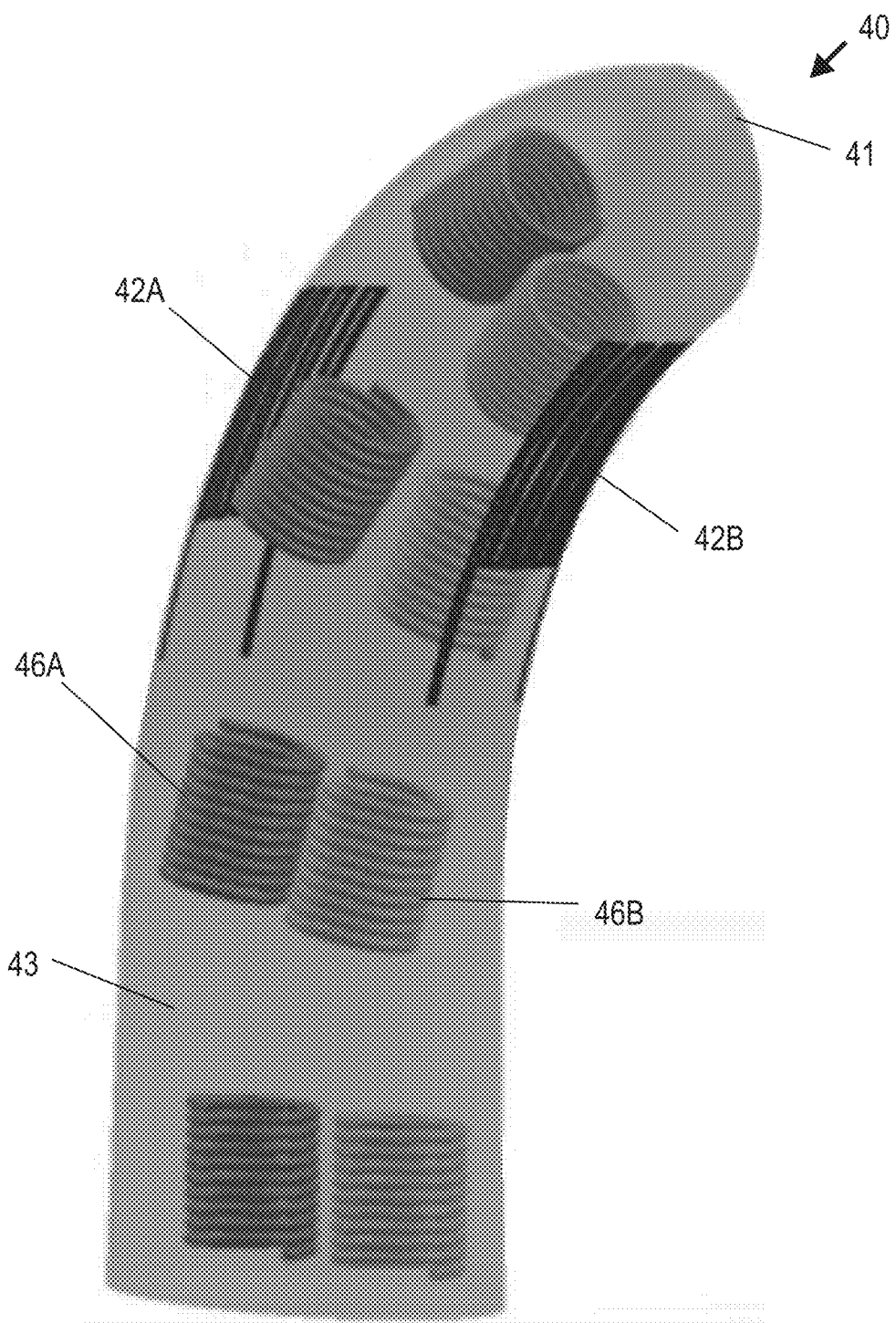
FIG. 3 is a simplified schematic diagram depicting an electromagnetically actuated robotic device according to one embodiment, the robotic device comprising an elastomeric body structure, multiple electromagnetic coils (e.g., embodying conductive filaments), and multiple pressure sensors.

FIG. 3 is a simplified schematic diagram depicting an electromagnetically actuated robotic device 40 according to one embodiment, the robotic device 40 comprising an elastomeric body structure 43, first and second rows of multiple electromagnetic coils 46A, 46B (e.g., embodying conductive filaments), and multiple pressure sensors 42A, 42B. The robotic device 40 is shown in a state with a tip 41 thereof pointed to the right, wherein such state may be produced by actuation of some of the electromagnetic coils 46A, 46B.

Figure 4:
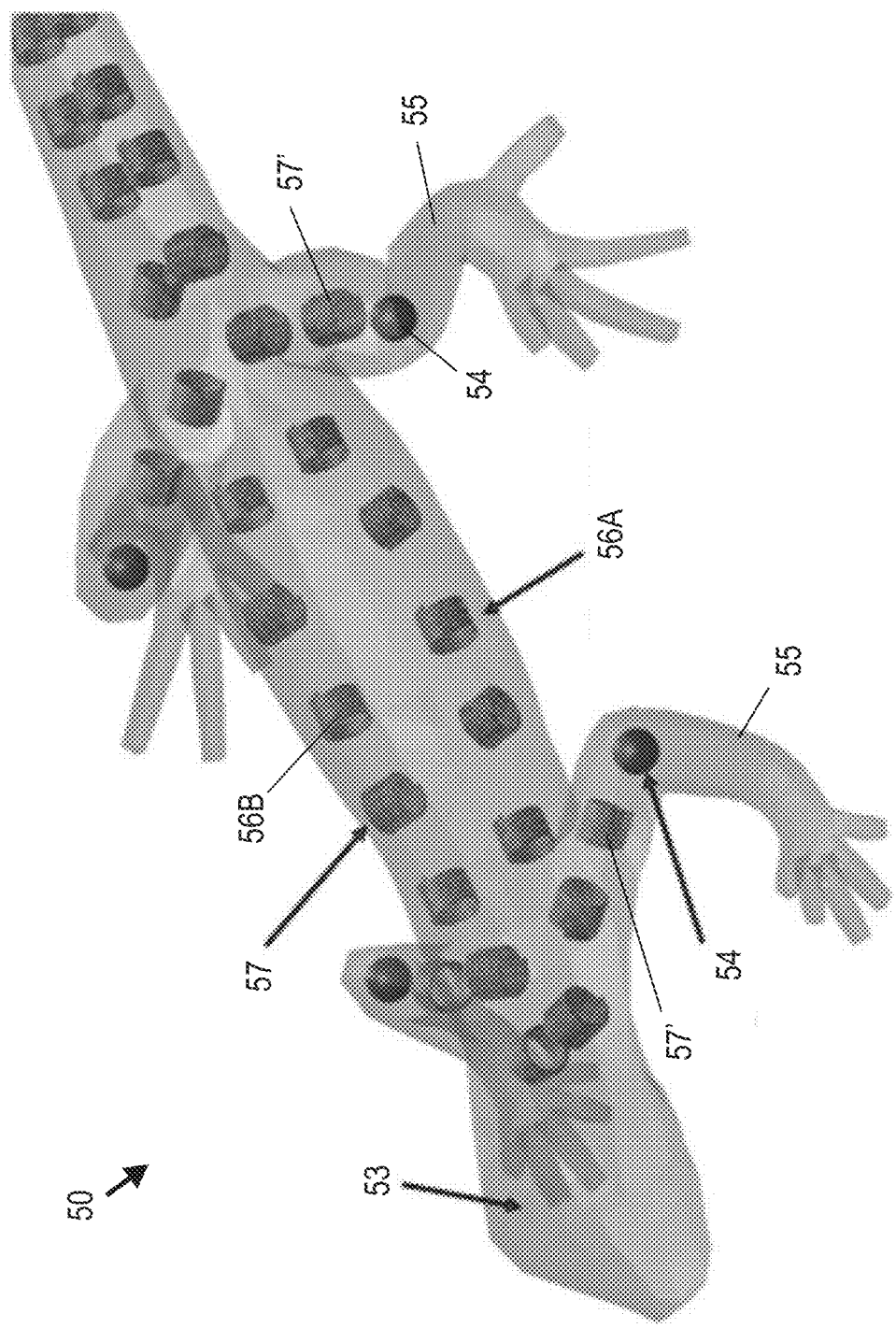
FIG. 4 is a simplified schematic diagram depicting an electromagnetically actuated robotic device inspired by a sandfish according to one embodiment, the robotic device comprising an elastomeric body structure, multiple electromagnetic coils aligned with (e.g., parallel to) the body structure, multiple electromagnetic coils arranged normal to the body structure, and magnetic paste arranged in limbs extending from a remainder of the elastomeric body structure.

FIG. 4 is a simplified schematic diagram depicting an electromagnetically actuated robotic device 50 inspired by a sandfish according to one embodiment, the robotic device 50 comprising an elastomeric body structure 53, multiple electromagnetic coils 56A, 56B aligned with (e.g., parallel to) the body structure 53, multiple electromagnetic coils 57 arranged normal to the body structure 53, and multiple elastomeric limbs 55 that extend from the body structure 53, and that include magnetic paste 54 as well as additional electromagnetic coils 57' arranged normal to the body structure 53. In certain embodiments, selected electromagnetic coils 56A, 56B, 57, 57' and magnetically responsive elements (e.g., magnetic paste 54) may be actuated in a manner to selectively produce, alter shape, and/or alter position of one or more limbs 55 relative to a remainder of an elastomeric body structure 53 of the electromagnetically actuated robotic device 50. Although not shown, it is to be appreciated that the robotic device 50 may additionally include a processor, a charge storage element, and traces within the body structure 43 and/or limbs 55.

In certain embodiments, motion and position sensing of limbs can be achieved using an inductance-based approach in which electromagnetic coils are placed on either side of a joint. As the joint bends, the coils move relative to each other, changing the inductance[xi].

Figure 5A:
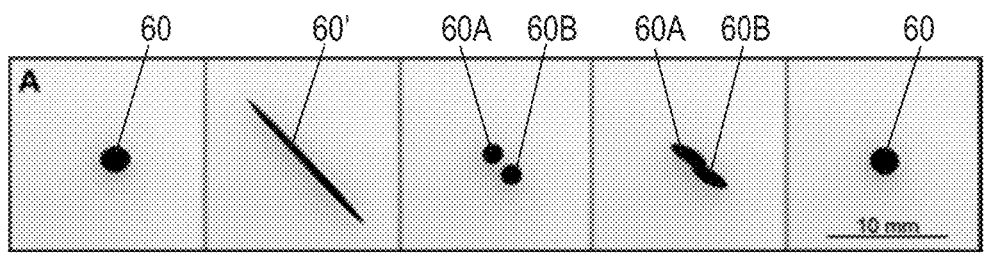
FIGS. 5A-5E illustrate closed-loop control of a magnetically actuated ferrofluid droplet, with FIG. 5A depicting separating and recombining of the ferrofluid droplet, FIG. 5B depicting squeezing of the ferrofluid droplet through a channel, FIG. 5C depicting the engulfing of particles into the ferrofluid droplet, FIG. 5D depicting the pushing of particles to target locations, and FIG. 5E depicting the generating of fluid flow in a microfluidic channel.
Figure 5B:
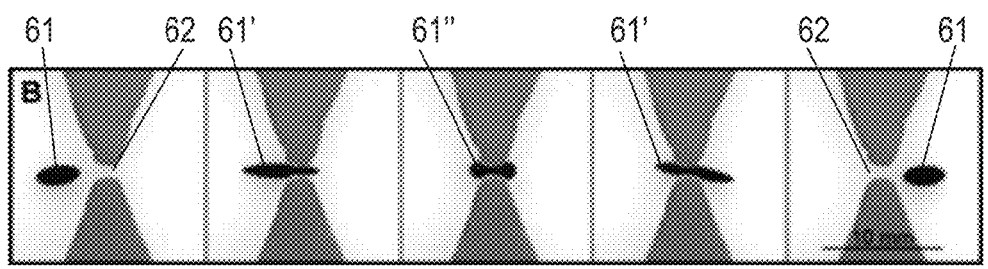
Figure 5C:
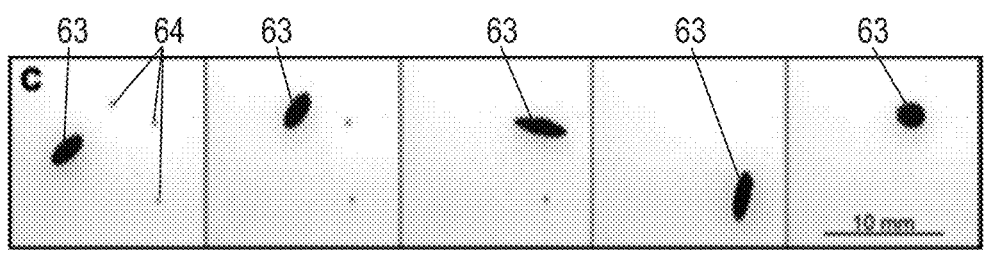
Figure 5D:
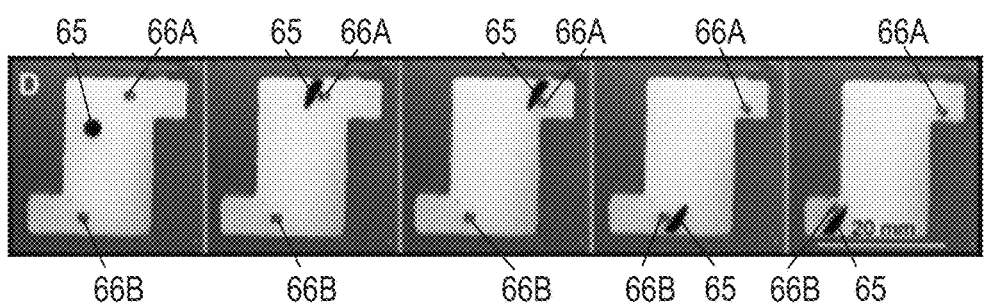
Figure 5E:
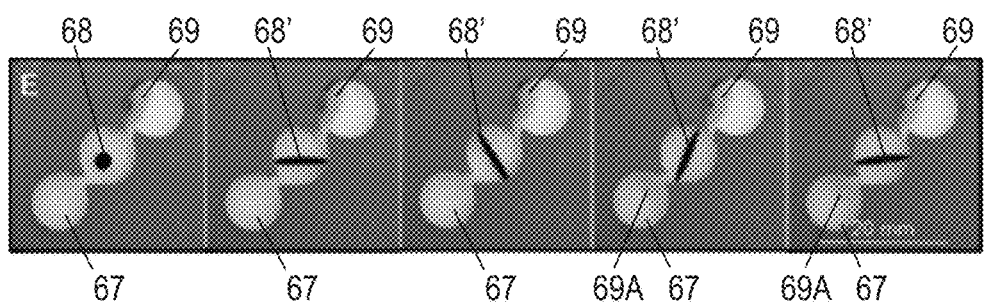

FIGS. 5A-5E illustrate closed-loop control of a magnetically actuated ferrofluid droplet. FIG. 5A includes multiple frames depicting a ferrofluid droplet in round form 60, the droplet in elongated form 60', the droplet separated into two components 60A-60B, the two components 60A-60B resuming contact, and the two components being recombined into round form 60. FIG. 5B depicts multiple frames of a ferrofluid droplet initially in an oval form 61 squeezing through a narrow channel 62, including deformation into an elongated form 61', then a barbell shaped form 61", then resuming the elongated form 61', and finally resuming the oval form 61. FIG. 5C depicts multiple frames of the engulfing of three particles 64 into a ferrofluid droplet 63. FIG. 5D depicting multiple frames of a ferrofluid droplet 65 particles 66A, 66B. FIG. 5E depicting the generating of fluid flow in a microfluidic channel structure 67 using a deformable ferrofluid droplet 68 initially in a round form, and subsequently in an elongated form 68', to rotate in close proximity to channel walls to cause a portion of fluid 69A to be withdrawn from a fluid plug 69. FIGS. 5A-5E demonstrate the feasibility of a physics-based remote control method for controlling position and shape of ferrofluid droplets in two dimensions.

Figure 6:
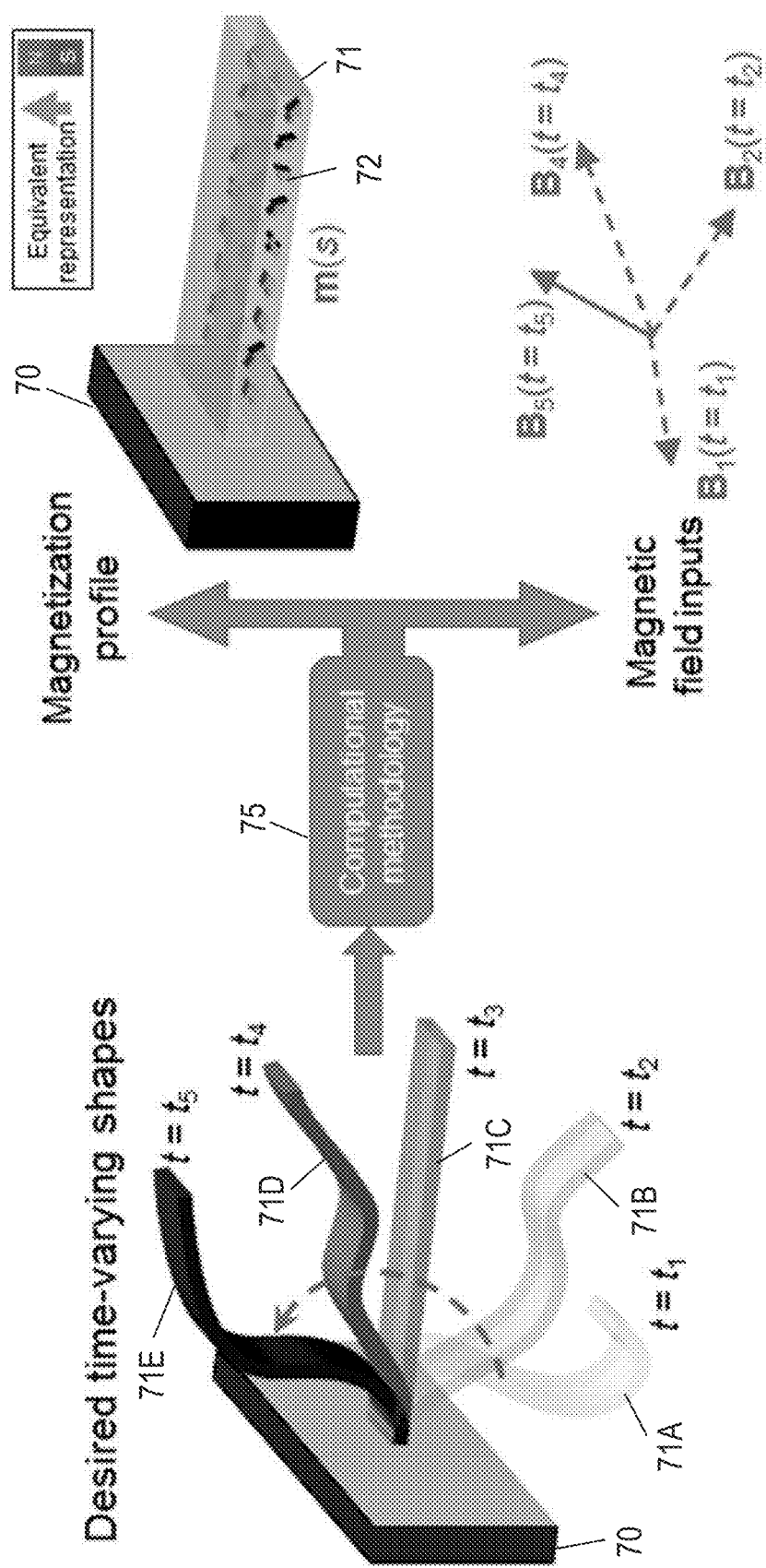
FIG. 6 is a schematic diagram illustrated magnetic programming of electromagnetic coils in a soft elastomeric body to produce complex time-varying shapes.

FIG. 6 is a schematic diagram illustrated magnetic programming of electromagnetic coils 72 in a soft elastomeric body 70 to deform the body to produce complex time-varying shapes 71A-71E (for times $t_1$ to $t_5$, respectively), wherein a first shape 71A is obtained at $t_1$ by application of a first magnetic field input $B_1$, a second shape 71B is obtained at $t_2$ by application of a second magnetic field input $B_2$, a third shape 71C is obtained at $t_3$ in the absence of a magnetic field input, a fourth shape 71D is obtained at $t_4$ by application of a fourth magnetic field input $B_4$, and a fifth shape 71E is obtained at $t_5$ by application of a fifth magnetic field input $B_5$. Desired time-varying shapes may be envisioned, and a computational methodology using a processor 75 may be used to determine a magnetization profile and suitable magnetic field inputs for actuators 72 (e.g., electromagnetic coils) arranged in an elastomeric (soft) body 70. Each actuator 72 is represented at upper right with an arrow to represent directionality of its associated magnetization profile.

Figure 7:
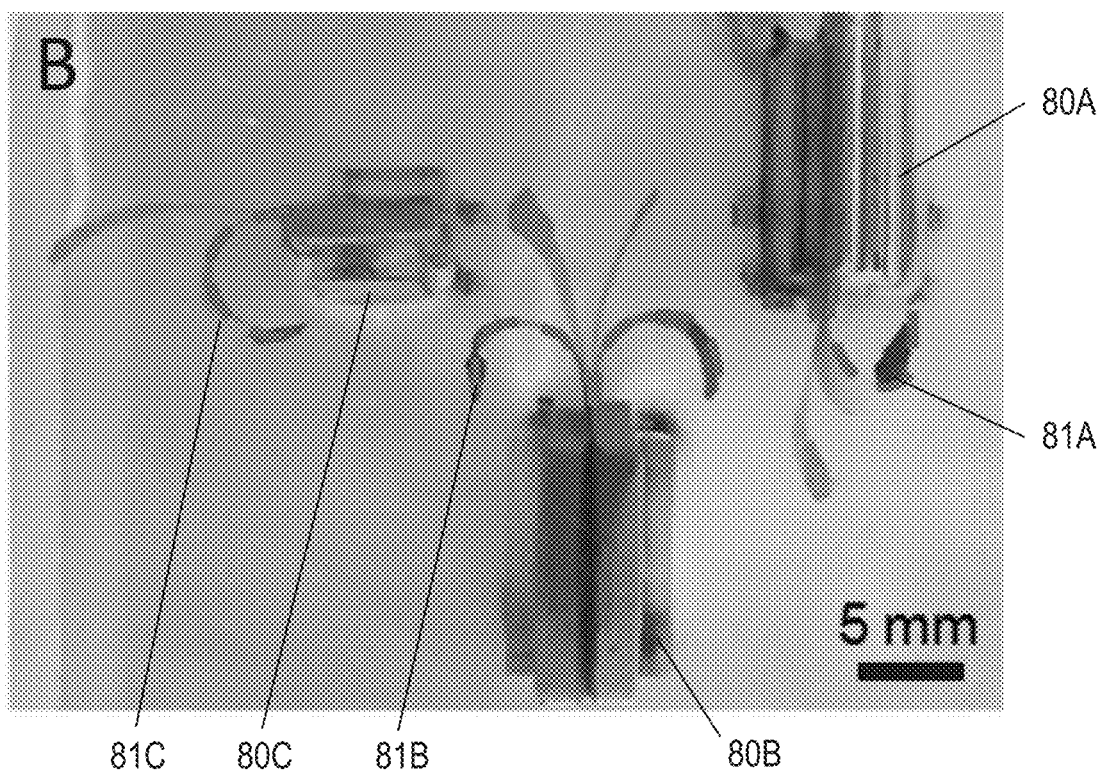
FIG. 7 is a photograph illustrating first through third electromagnetically actuated robotic devices with elastomeric bodies deflected into a "C" shape, a "M" shape, and a "U" shape, respectively.

FIG. 7 is a time lapse photograph illustrating first through third electromagnetically actuated robotic devices 80A-80C with elastomeric members 81A-81C in two positions, respectively, wherein an elastomeric member 81A is deflected into a "C" shape, two elastomeric members 81B are deflected (from a V-shape) into a "M" shape, and elastomeric member 81C is deflected into a "U" shape.

Figure 8:
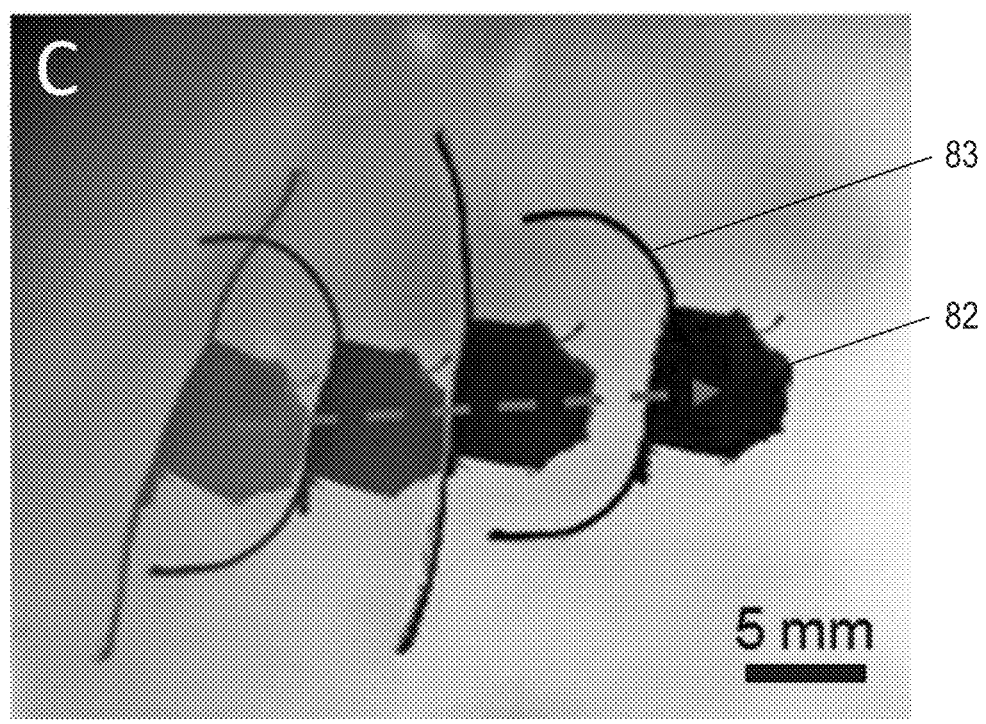
FIG. 8 is a photograph depicting an electromagnetically actuated jellyfish-like robotic device in four positional states.

FIG. 8 is a photograph depicting an electromagnetically actuated jellyfish-like robotic device 82 with two deflectable members 83, shown in four positional states of locomotion in a direction from left to right in a fluid medium.

Figure 9B:
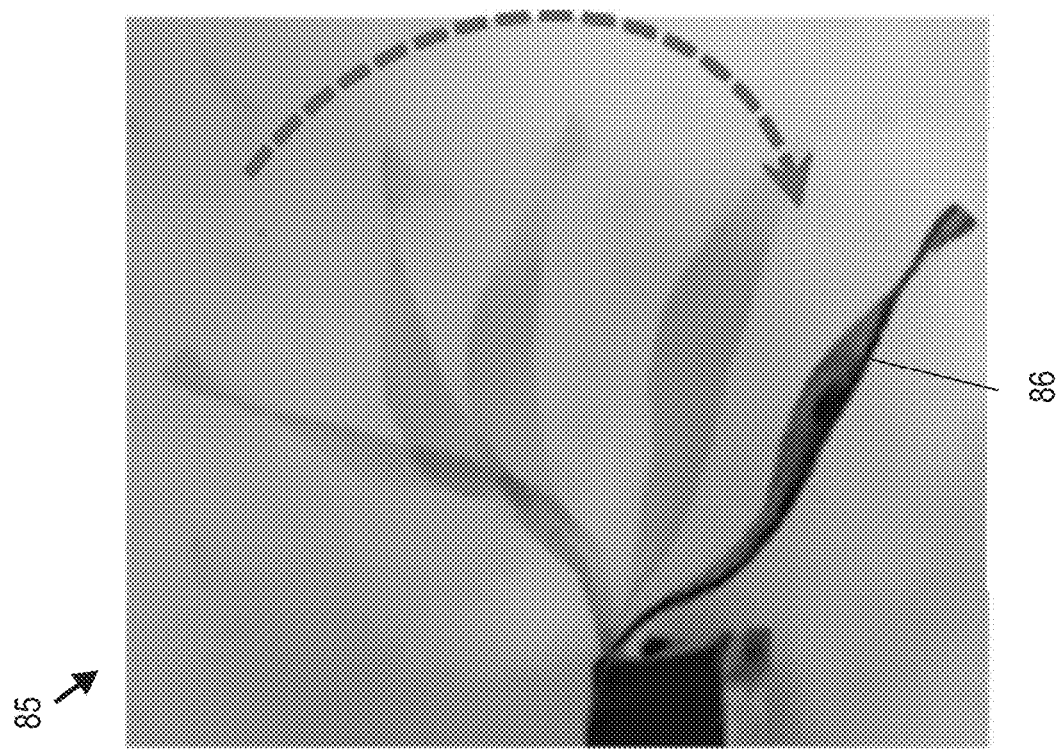
FIGS. 9A-9B are photographs of an electromagnetically actuated robotic device resembling an artificial cilium, depicted in a recovery stroke in FIG. 9A and depicted in a power stroke in FIG. 9B.
Figure 9A:
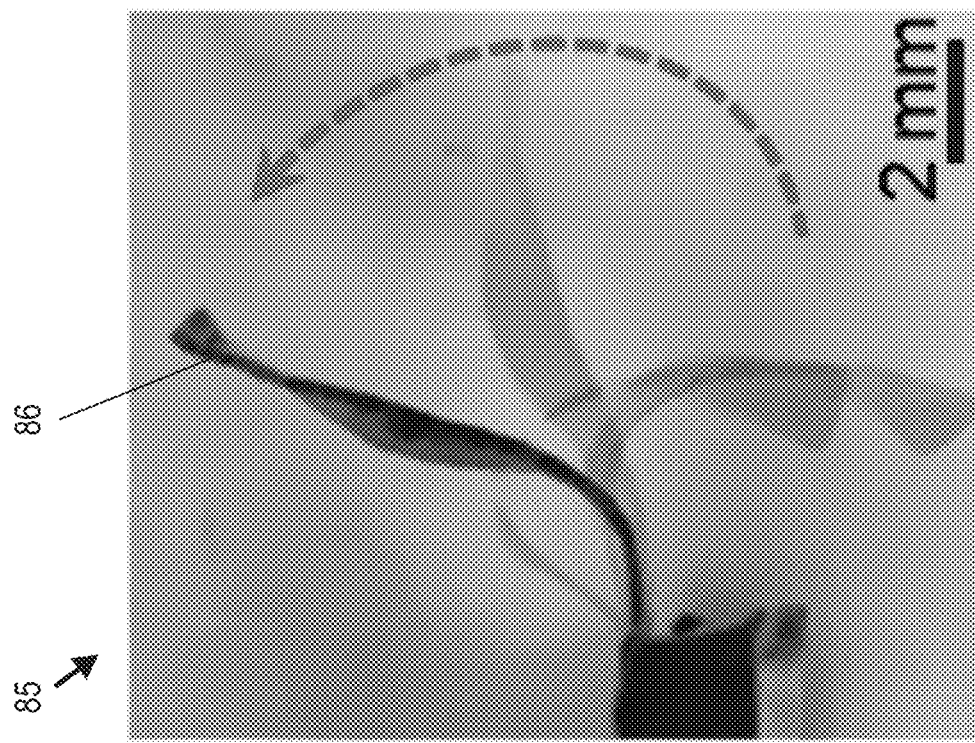

FIGS. 9A-9B are time lapse photographs of an electromagnetically actuated robotic device 85 resembling an artificial cilium, having a deflectable member 86 shown in a recovery stroke in FIG. 9A, and having the deflectable member 86 shown in a power stroke in FIG. 9B.

Various fabrication techniques may be used to one or more portions of electromagnetically actuated robotic devices according to embodiments of the present disclosure. In certain embodiments, three-dimensional printing of various types may be used to produce one or more portions of a robotic device. In certain embodiments, one or more portions of an elastomeric body structure may be produced by molding. In certain embodiments, selected components such as a charge storage element and/or one or more processors may be prefabricated and integrated into a robotic device by any suitable method, such as pick-and-place addition with electrical connections made by conductive paste, soldering, and/or three-dimensional printing.

Figure 10:
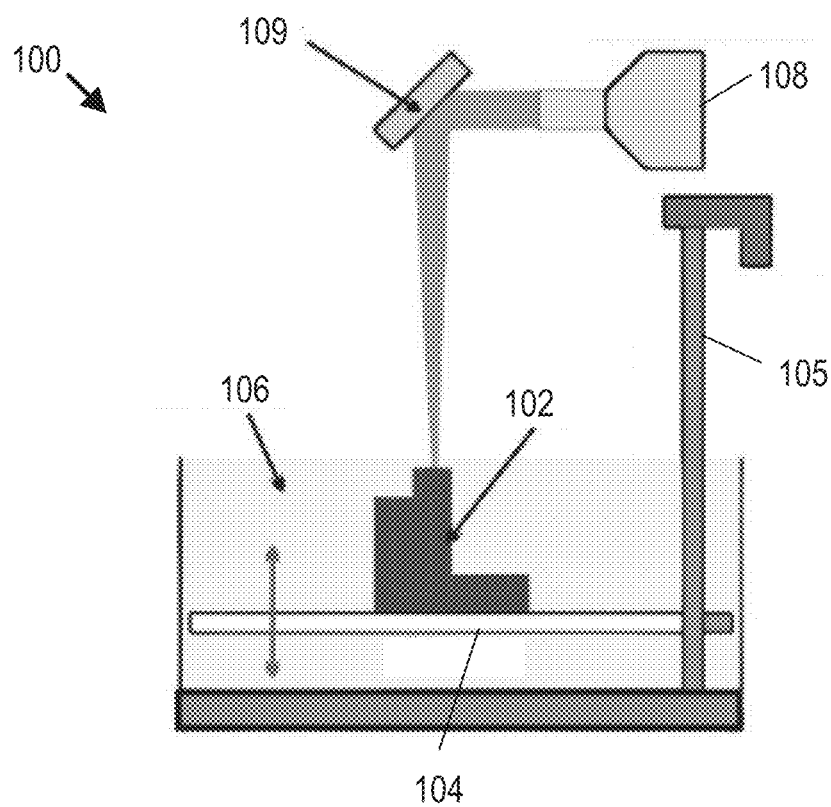
FIG. 10 is a schematic diagram of a stereo lithography (SLA) three-dimensional printing process useable for producing one or more portions of electromagnetically actuated robotic devices according to embodiments of the present disclosure.

FIGS. 10-15 schematically illustrate apparatus for performing various types of known three-dimensional printing processes that may be used to produce one or more portions of an electromagnetically actuated robotic device as described herein. FIG. 10 is a schematic diagram of a stereo lithography (SLA) three-dimensional printing apparatus 100 useable for producing one or more portions of electromagnetically actuated robotic devices according to embodiments of the present disclosure, such as a printed object 102. The apparatus 100 includes a translation stage 104 (including a z-axis stage 105) supporting the printed object 102 immersed in source material 106. A laser source 108 and a mirror 109 are arranged to impinge laser emissions on portions of the source material 106 to produce the printed object 102.

Figure 11:
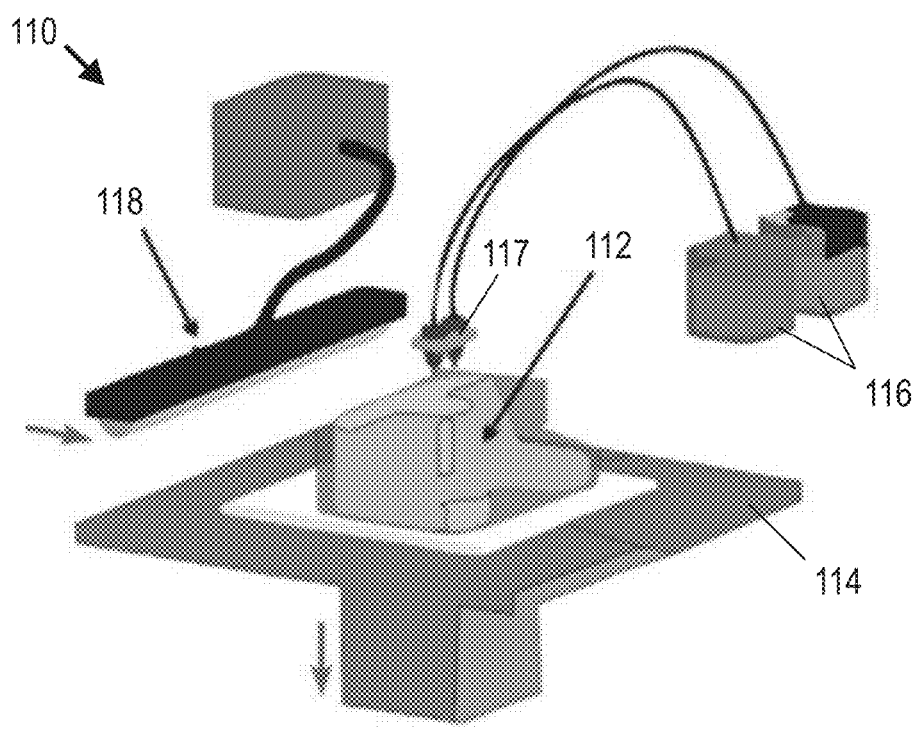
FIG. 11 is a schematic diagram of an inkjet printing three-dimensional printing process useable for producing one or more portions of electromagnetically actuated robotic devices according to embodiments of the present disclosure.

FIG. 11 is a schematic diagram of an inkjet printing three-dimensional printing apparatus 110 useable for producing one or more portions of electromagnetically actuated robotic devices according to embodiments of the present disclosure, such as printed object 112. The apparatus 110 includes a translation stage 114 onto which a printed object 112 is produced by supplying printing materials through printing heads 117. A milling head 118 may be used to further shape the printed object 112 after one or more printing steps are completed.

Figure 12:
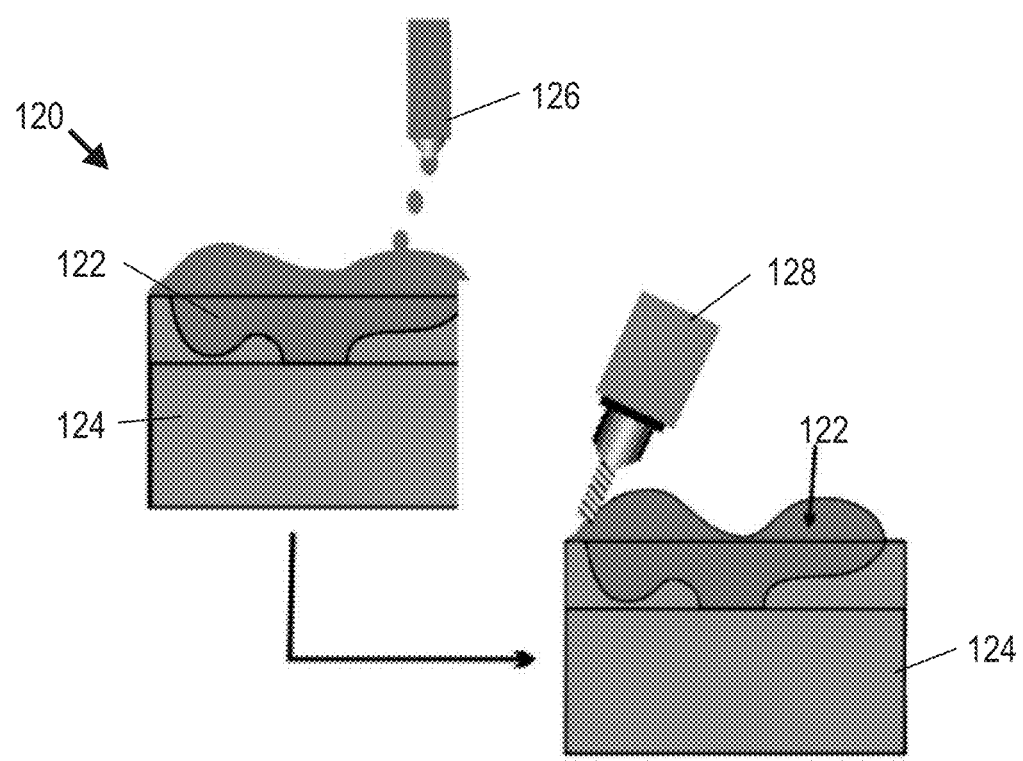
FIG. 12 is a schematic diagram of a shape deposition modeling (SDM) three-dimensional printing process useable for producing one or more portions of electromagnetically actuated robotic devices according to embodiments of the present disclosure.
Figure 13:
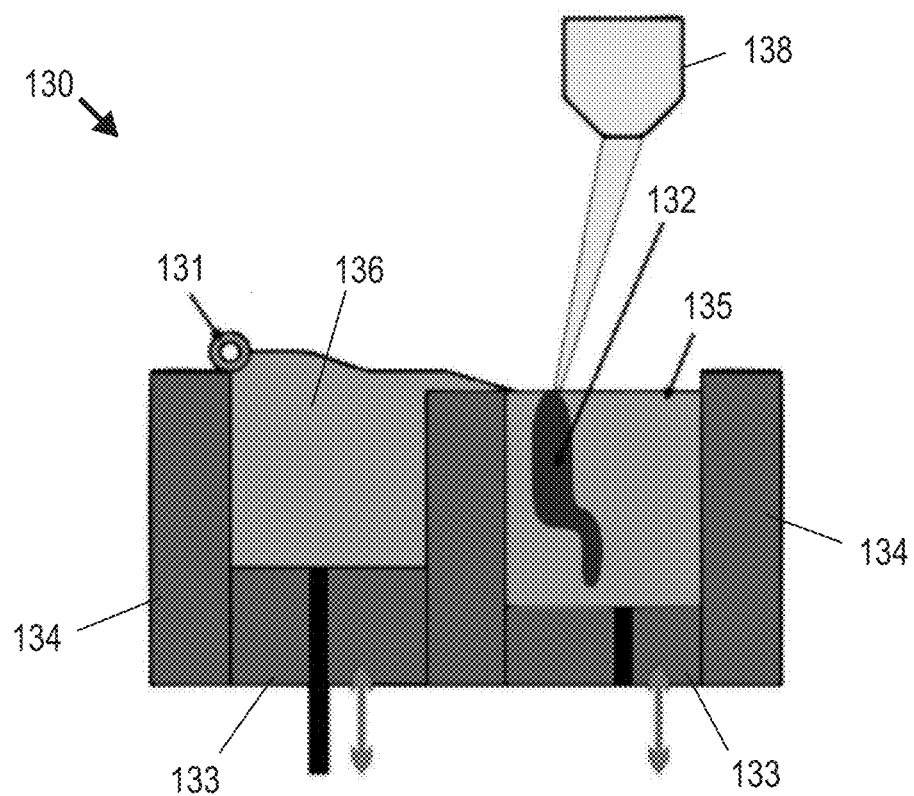
FIG. 13 is a schematic diagram of a selective laser sintering (SLT) three-dimensional printing process useable for producing one or more portions of electromagnetically actuated robotic devices according to embodiments of the present disclosure.

FIG. 12 is a schematic diagram of a shape deposition modeling (SDM) three-dimensional printing apparatus 120 useable for producing one or more portions of electromagnetically actuated robotic devices according to embodiments of the present disclosure, such as printed object 122. The apparatus 120 includes a translation stage 124 onto which a printed object 122 is produced by supplying printing materials through a printing nozzle 126. Thereafter, a milling head 128 (e.g., a computer numerical controlled (CNC) milling head) may be used to further shape the printed object 122 after one or more printing steps are completed FIG. 13 is a schematic diagram of a selective laser sintering (SLT) three-dimensional printing apparatus 130 useable for producing one or more portions of electromagnetically actuated robotic devices according to embodiments of the present disclosure, such as printed object 132. As shown at left, a material reservoir 136 defined in a housing 134 may be arranged above a piston 133, and a leveling drum 131 may be used to level powdered material (providing a powdered material surface 135) above the material reservoir 136 following translation of the piston 133. Thereafter, a translatable laser 138 is arranged to impinge laser emissions on the powdered material surface 135 to selectively fuse regions of the powdered material to form the printed object 132.

Figure 14:
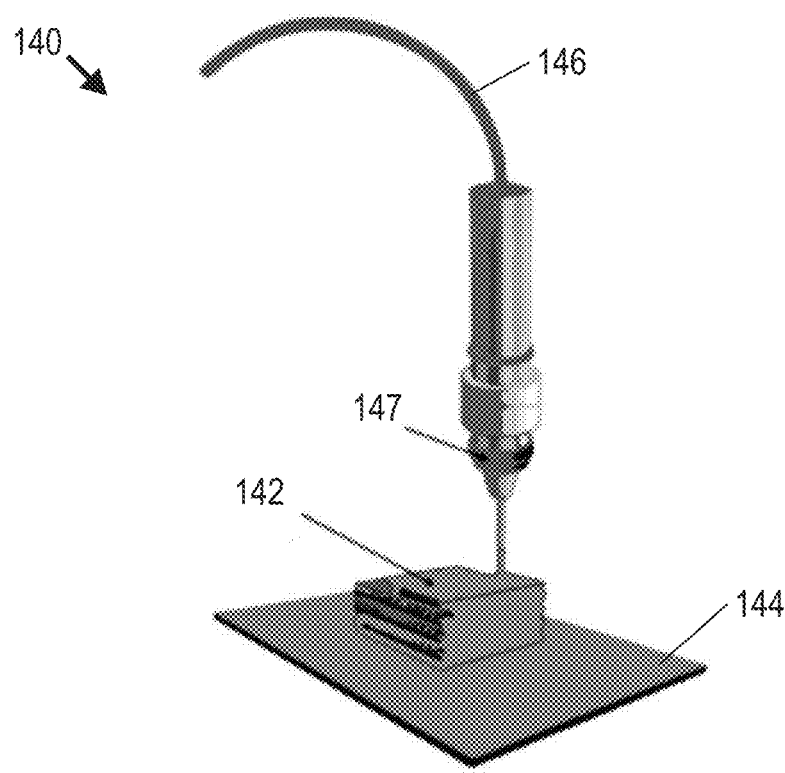
FIG. 14 is a schematic diagram of a direct ink writing (DIW) three-dimensional printing process useable for producing one or more portions of electromagnetically actuated robotic devices according to embodiments of the present disclosure.

FIG. 14 is a schematic diagram of a direct ink writing (DIW) three-dimensional printing apparatus 140 useable for producing one or more portions of electromagnetically actuated robotic devices according to embodiments of the present disclosure, such as printed object 142. The apparatus 140 includes a translation stage 144 onto which a printed object 142 is produced by supplying printing materials through a hose 146 and a printing nozzle 147.

Figure 15:
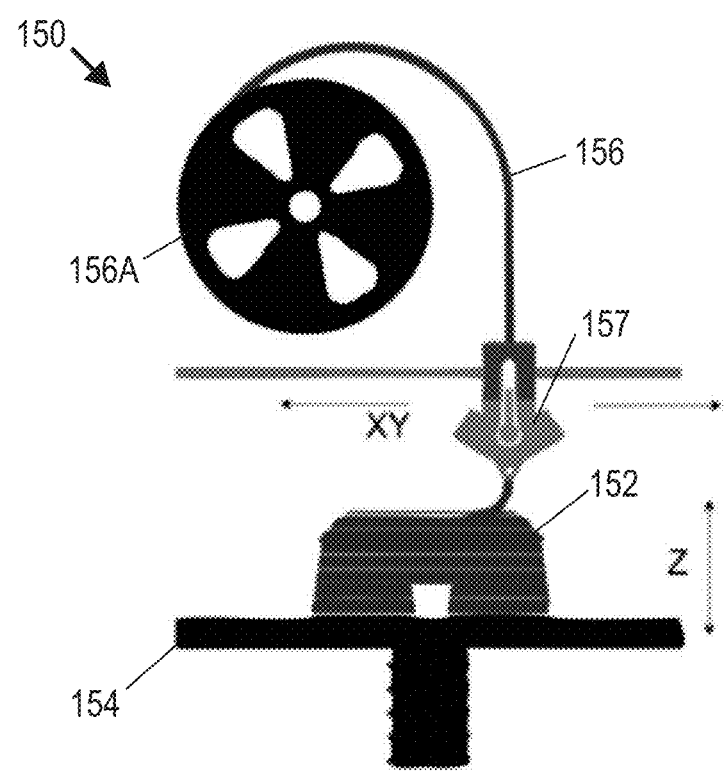
FIG. 15 a schematic diagram of a fused deposition modeling (FDW) three-dimensional printing process useable for producing one or more portions of electromagnetically actuated robotic devices according to embodiments of the present disclosure.

FIG. 15 a schematic diagram of a fused deposition modeling (FDW) three-dimensional printing apparatus 150 useable for producing one or more portions of electromagnetically actuated robotic devices according to embodiments of the present disclosure, such as printed object 152. The apparatus 150 includes a Z-axis translation stage 154 onto which a printed object 152 is produced by supplying one or more filament material 156 (received from reels 156A) through one or more X-Y axis translatable printing heads 157. Any desired shaping steps may be performed to shape the printed object 152 after one or more printing steps are completed.

Each 3D printing method has its own benefits and limitations, and may be conducive to different types of soft material and robots. Certain embodiments disclosed herein utilize fused deposition modeling (FDM) (also referred to as fused filament fabrication) and direct-ink-writing (DIW) approaches to facilitate adaptation to a wide range of materials. FDM and DIW may be performed without need for chemical baths and lasers, and such techniques may require little to no post-processing steps to develop the final product (as compared to shape deposition modeling, which frequently requires milling and processing).

In certain embodiments, an all-in-one (AIO) three-dimensional (3D) printing apparatus may be used to print soft (e.g., elastomeric), magnetic, conductive, and fluidic materials, which may be useful for rapid prototyping and/or commercial fabrication of electromagnetically actuated robotic devices. In certain embodiments, an AIO 3D printing apparatus may utilize multiple print heads each handling a different material with different extrusion and curing requirements. In certain embodiments, an all-in-one print head assembly may utilize light weight extruders for numerous types of soft materials, allowing at least five different materials to be simultaneously loaded. In certain embodiments, these extruders may be filament compatible or syringe compatible in any desired combination. In certain embodiments, an AIO 3D printing apparatus may include fans for cooling, UV lamps to promote material curing, and heating elements to promote curing.

For printing of soft robots using the FDM techniques, certain embodiments may utilize commercial filaments such as NinjaFlex (NinjaTek)[xiii]. In certain embodiments, softer materials such as PDMS and/or Dragon Skin™ with Shore A hardness ranges of 2A-30A and 46A-61A, respectively.

Examples of elastomeric materials that may be used to produce body structures of electromagnetically actuated robotic devices include silicone, silicone rubber, PDMS, hydrogel, NinjaFlex and Dragon Skin. In certain embodiments, the foregoing materials may be heat curable, curable with ultraviolet light, or cured with air or chemicals.

Another option for rapid prototyping of electromagnetically actuated robotic devices with elastomeric body structures includes direct ink writing with silicone-based polymers, which involves both printing liquid materials and curing them rapidly with heat or UV as they come out of the nozzle. In certain embodiments, a silicone 3D printer may be created using a standard, low-cost printing base such as the Anet A8 and has custom attachments to allow for a syringe head to be coupled to the printer. The silicone components are injected independently into the printing syringe, mixed, and then heated as they are extruded to allow for quick curing[xiv].

In addition to the elastomeric body structure of an electromagnetically actuated robotic device, the electronics used in such structures also need to withstand extreme flexion and wide ranges of motion. A variety of durable and self-healing designs have been explored for such applications[xv]. In particular, liquid metal circuitry has been explored recently, showing capabilities of self-healing to maintain electrical connections and sense damage to the circuit itself[xvi,xvii,xviii]. There are several studies on 3D printing of liquid metals[xix,xx,xxi]. Liquid metal circuits, although very resilient, require careful design considerations such as pre-planning the channels for the liquid metal. Considering these challenges, conductive filaments have also been explored. For example, Electrifi™ is a commercially available conductive filament that was shown to be significantly more flexible than competitive conductive filaments such as Black Magic 3D and Proto-pasta[xxii]. Electrifi™ is a conductive filament that incorporates copper into a polymer composite.

3D printing magnetic materials has similar challenges as conductive materials; however, there are further challenges associated with the necessity of magnetizing the ferromagnetic particles in the desired directions. Magnetization is generally achieved using a strong magnetic field which needs to be integrated with the 3D printing process. In 2018, a group of researchers from Massachusetts Institute of Technology successfully developed a technique to reorient and print magnetic paste[xxiii]. The technique uses either an electromagnetic coil or permanent ring magnets around the nozzle of the extruder to reorient the magnetic particles as they are about to exit the tip. In certain embodiments, this technology may be integrated into a base silicone printer to allow for soft magnetic components to be printed into the robots, allowing for magnetic actuation and morphing.

Printing fluidic materials or liquid resins require particular design considerations similar to liquid metals. These materials are generally molded, and this molding concept needs to be brought to 3D printing by first printing a structural support with polylactic acid (PLA) or other plastic materials and then printing the resin solution into this using a syringe extrude[xxiv]. Other versions of this technique include printing the resins or soft materials into a support bath[xxv]. The support bath is a material which becomes fluid when it is above its yield stress, allowing for printing resin to be added by a nozzle, and then solidifies as the nozzle is removed, providing support. Alternatively, curing the resins as they are extruded from the syringe is an option and was shown to be effective[xxvi]. Liquid materials that need to remain in a liquid state, must be printed into pre-planned capsules or channels depending on their purpose. This channeling approach will be used as a way to print ferrofluid droplets into the robot in order to tune the embedded electrical components on-board. Ferrofluids, like other colloidal suspensions, need nozzles which allow for both the fluid and particles in the fluid to be expelled without clogging. If the nozzle design does not account for this and the particles accumulate, it will not only prevent the fluid from printing but also can affect the density of the particles and make their distribution non-homogeneous.

With the ability to print such an extensive list of materials, rapid prototyping of soft sensors and actuators can be realized. Strain sensors can be printed using conductive materials such as carbon-based, metallic particle doped materials, and liquid metals as capacitive sensors and resistive sensors[xxvii,xxviii,xxix]. Furthermore, motion and position sensing of limbs has also been successfully achieved using an inductance-based approach in which coils are placed on either side of a joint. As the joint bends, the coils move relative to each other, changing the inductance[xxx]. This may be readily implemented in embodiments according to the present disclosure using conductive filaments to produce coils.

In certain embodiments, soft actuators comprising electromagnetic coils may be produced by 3D printing. In certain embodiments, pneumatic actuators and/or active materials may be provided by techniques such as 3D printing. For instance, ionic polymer metal composites (IPMCs) have low voltage requirements, can achieve large deformations, and can be printed as filaments[xxxi]. Dielectric elastomer actuators (DEAs) useable as actuators for soft robotic applications may also be applied by 3D printing[xxxii]. Such materials have also been used as tactile sensors by creating artificial whiskers[xxxiii].

Figure 16:
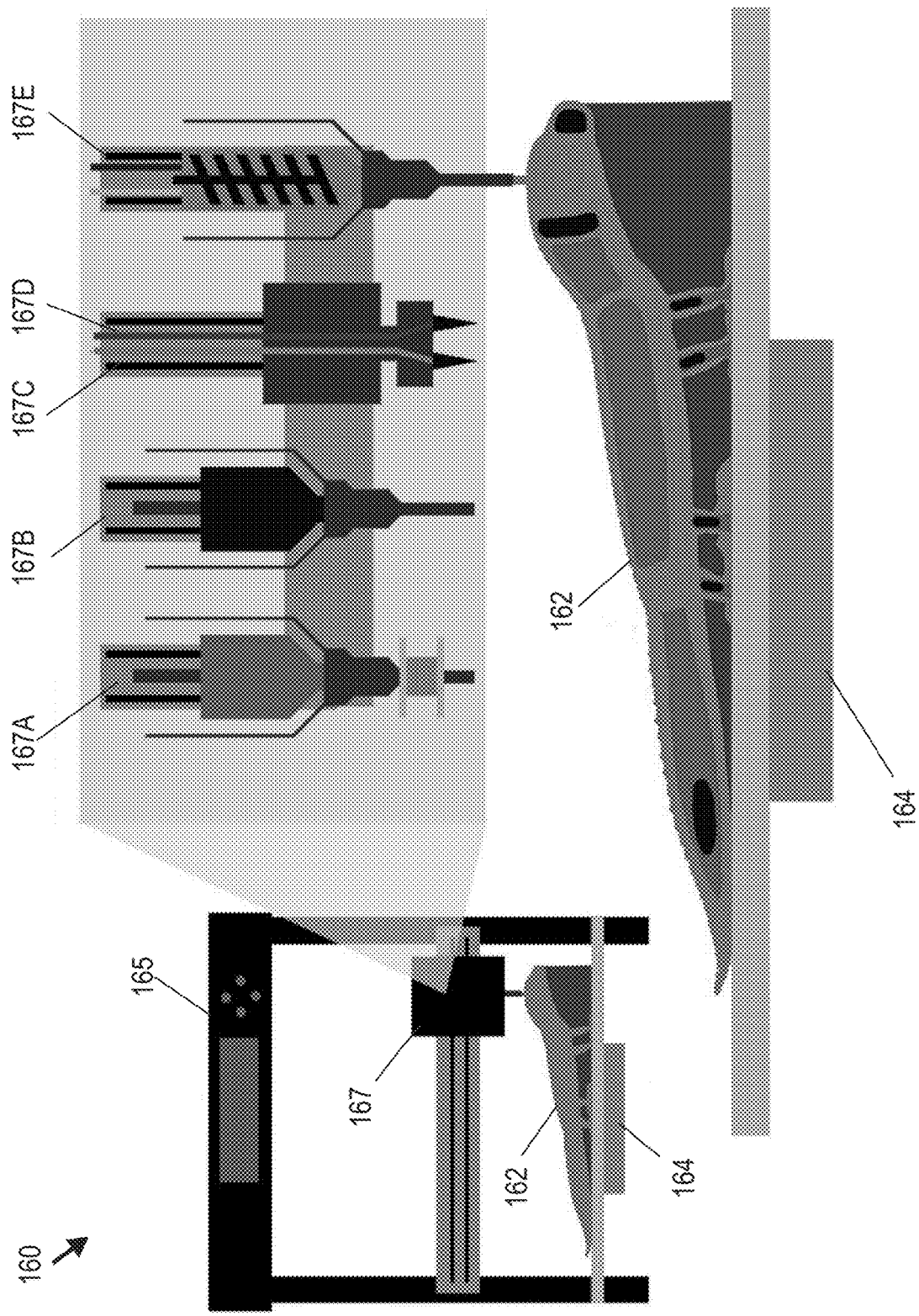
FIG. 16 is a schematic diagram depicting a multi-material 3D printing apparatus including a print head and reservoirs for magnetic material, ferrofluid material, conductive materials, support materials, and elastomeric material, suitable for producing electromagnetically actuated robotic devices according to embodiments of the present disclosure.

FIG. 16 is a diagram schematically illustrating a multi-material 3D printing system 160 including a multi-material 3D printer 165 having a moveable print head 167 and utilizing multiple reservoirs and/or extruders (e.g., lightweight extruder reservoirs) such as magnetic material extruder reservoir 167A, ferrofluid material extruder reservoir 167B, conductive material extruder reservoir 167C, support material extruder reservoir 167D, and elastomeric material extruder reservoir 167E, suitable for producing electromagnetically actuated robotic devices according to embodiments of the present disclosure, such as printed object 162 arranged on support 164.

To address potential issues of delamination and material detachment due to Young's modulus incompatibility of adjacent printed materials, various techniques may be used by the multi-material 3D printing apparatus of FIG. 16, including: use of composite multi-material filaments, liquid-wetting of soft solids using ionic liquids, and/or gradient material printing. Multiphysics simulations in COMSOL may also be conducted to explore and mitigate any potential interference between sensors and actuators, including interference between ferrofluids in variable electronics and coils designed for morphing and locomotion and/or coils responsible for tuning electronic components.

After optimizing each functional component of an electromagnetically actuated robotic device, topology optimization may be used to combine various components into an optimized integrated design. Particularly, knowing a desired set of tasks (i.e. manipulation and locomotion tasks) and the characteristics of the functional components, topology optimization algorithms may be used to optimize count and placement of embedded actuation and sensing components, amount and placement of printable magnetic material, placement of electrical connective lines, and overall morphology of an electromagnetically actuated robotic device. Being able to 3D print the foregoing components allows for rapid prototyping of any complex design that may be determined by a topology optimization algorithm.

In certain embodiments, electromagnetically actuated robotic devices may incorporate magnetically tunable electronic components such as resistors, inductors, and/or capacitors. Such components may utilize a mobile ferrofluid/iron particle mixture flowing within a microfluidic channel embedded in the robotic device[xxxiv]. As the ferrofluid/iron particle mixture is moved responsive to an applied magnetic field, electrical properties of the component (e.g., resistance, inductance, capacitance, quality factor, and self-resonance frequency) may change accordingly. Examples of magnetically tunable electronic components that may be used in electromagnetically actuated robotic devices are shown in FIGS. 17-20.

Figure 17:
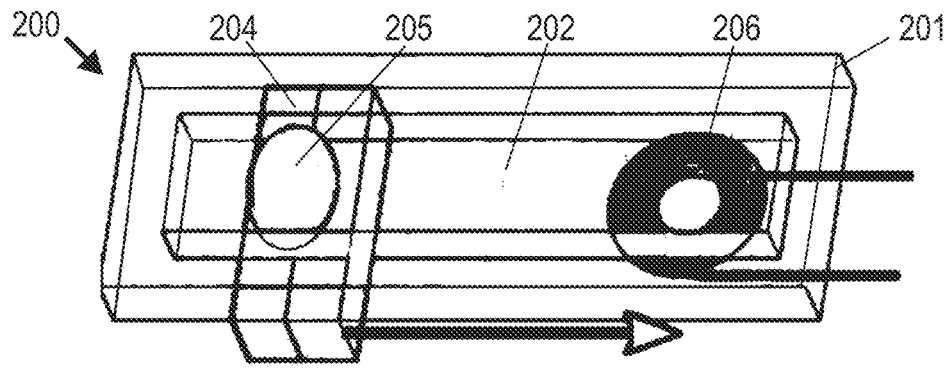
FIG. 17 illustrates a magnetically tunable planar inductor utilizing a mobile ferrofluid/iron particle mixture flowing within a microfluidic channel, and that may be integrated into an electromagnetically actuated robotic device according to one or more embodiments.

FIG. 17 illustrates a magnetically tunable planar inductor 200 utilizing a mobile ferrofluid/iron particle mixture 205 configured to move within a microfluidic channel 202 defined in a PDMS body structure 201, with an electromagnetic coil 206 arranged perpendicular to the channel 202. Optionally, a permanent magnet 204 may be arranged at another position relative to the channel 202 to bias the mobile particle 205 into a desired position. Energizing the electromagnetic coil 206 may serve to adjust inductance provided by the inductor 200. The tunable planar inductor 200 may be integrated into an electromagnetically actuated robotic device according to one or more embodiments.

Figure 18:
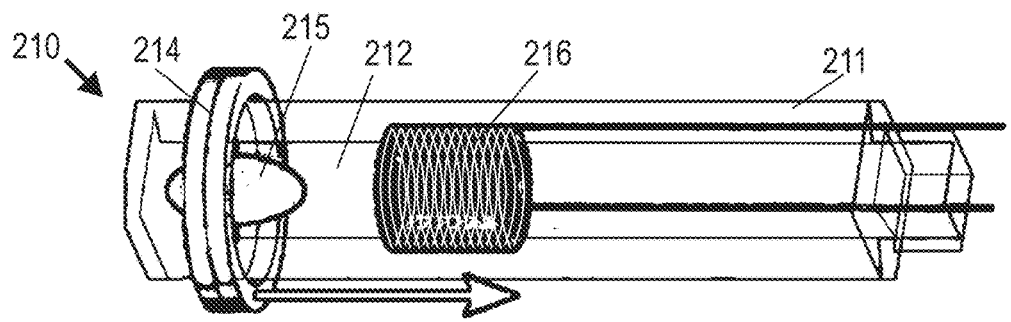
FIG. 18 illustrates a magnetically tunable axial inductor utilizing a mobile ferrofluid/iron particle mixture flowing within a microfluidic channel, and that may be integrated into an electromagnetically actuated robotic device according to one or more embodiments.

FIG. 18 illustrates a magnetically tunable axial inductor 210 utilizing a mobile ferrofluid/iron particle mixture 215 configured to move within a microfluidic channel 212 defined in a PDMS body structure 211, with an axial electromagnetic coil 216 arranged along (and parallel to) the channel 212, with a ring-shaped magnet 214 also provided around the channel 212. The tunable axial inductor 201 may be integrated into an electromagnetically actuated robotic device according to one or more embodiments.

Figure 19:
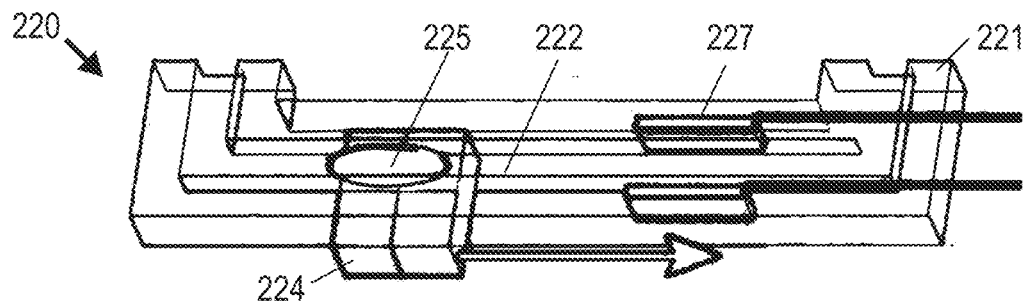
FIG. 19 illustrates a magnetically tunable parallel plate capacitor utilizing a mobile ferrofluid/iron particle mixture flowing within a microfluidic channel, and that may be integrated into an electromagnetically actuated robotic device according to one or more embodiments.

FIG. 19 illustrates a magnetically tunable parallel plate capacitor 220 utilizing a mobile ferrofluid/iron particle mixture 225 configured to move a microfluidic channel 222 defined in a PDMS body structure 221, with energizable parallel plates 227 arranged along opposing sides of the channel 222 at one end thereof. Optionally, a magnet 224 may be positioned relative to the channel 222 to bias the mobile particle 225 into a desired position. The tunable parallel plate capacitor 220 may be integrated into an electromagnetically actuated robotic device according to one or more embodiments.

Figure 20:
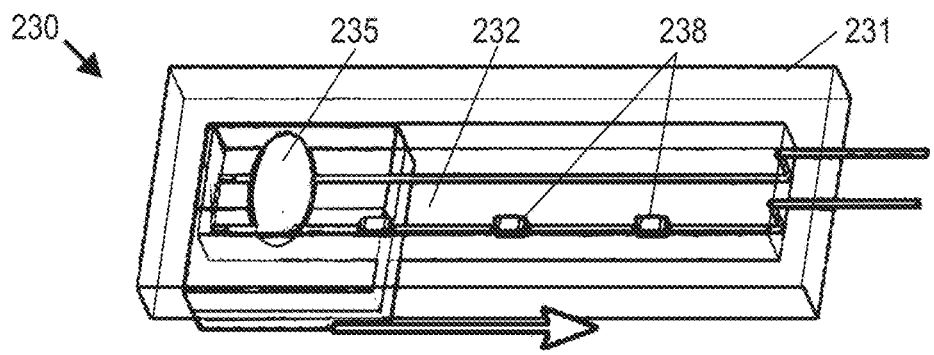
FIG. 20 illustrates a magnetically tunable resistor utilizing a mobile ferrofluid/iron particle mixture flowing within a microfluidic channel, and that may be integrated into an electromagnetically actuated robotic device according to one or more embodiments.

FIG. 20 illustrates a magnetically tunable resistor 230 utilizing a mobile ferrofluid/iron particle mixture 235 configured to move within a microfluidic channel 232, with multiple resistors 238 arranged at different positions relative to the channel 232. Optionally, a magnet 234 may be positioned relative to the channel 232 to bias the mobile particle 235 into a desired position. The resistor 230 may be integrated into an electromagnetically actuated robotic device according to one or more embodiments.

Electromagnetically actuated robotic devices as disclosed herein may be tested under a variety of manipulation and locomotion tasks, wherein such testing may be performed with testbeds.

Figure 21:
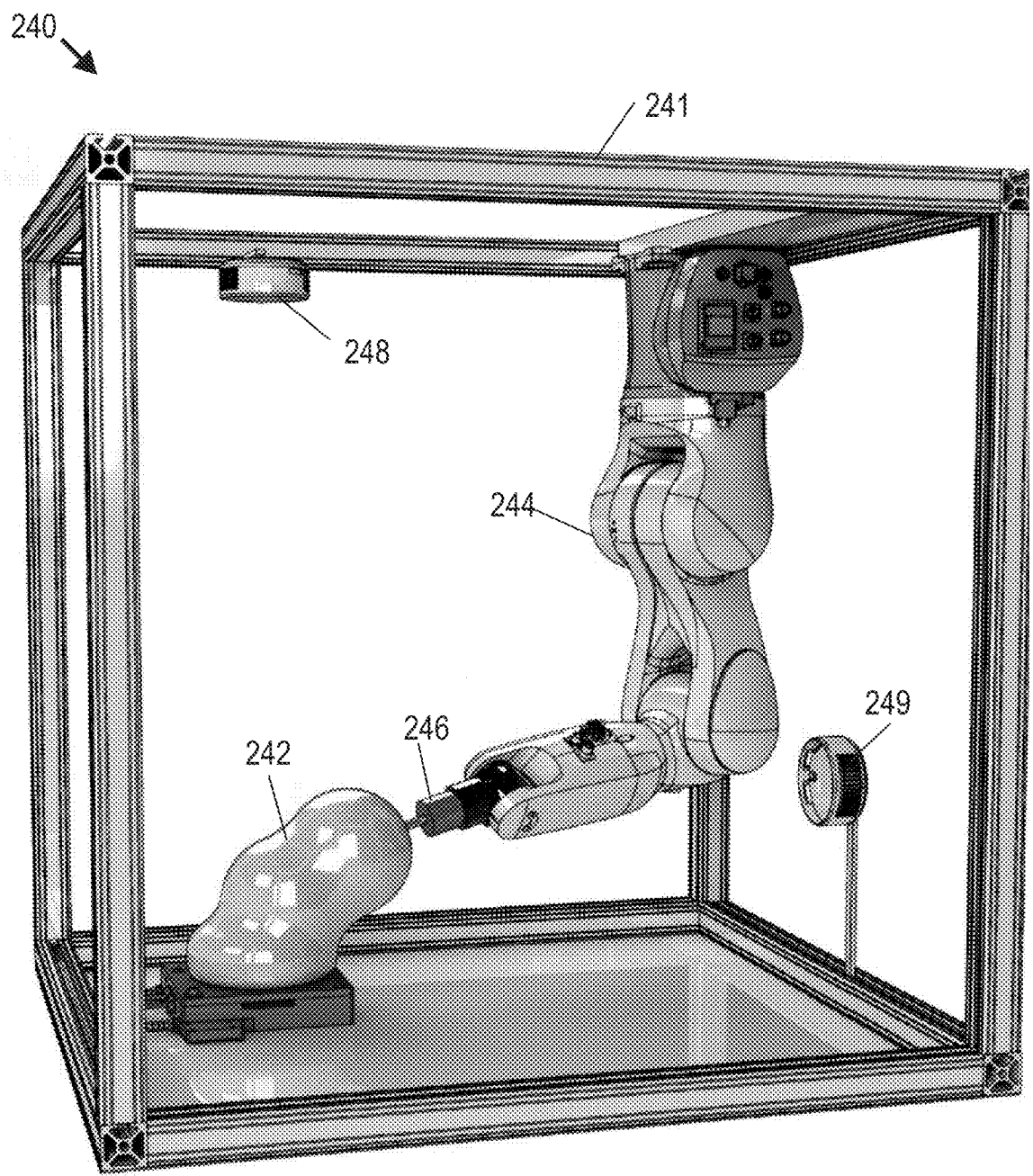
FIG. 21 is a schematic illustration of a testbed for performing manipulation tests for evaluating electromagnetically actuated robotic devices according to one or more embodiments.

FIG. 21 is a schematic illustration of a testbed 240 for performing manipulation tests for evaluating electromagnetically actuated robotic devices according to one or more embodiments. The testbed 240 incudes a frame 241 supporting a six degree of freedom (6-DOF) robotic arm 244 for generating complex end-effector displacement trajectories, with a multi-axis load cell 246 supported by an end of the robotic arm 244. A high-resolution 3D motion capture system (e.g., using multiple depth cameras 248, 249) may be used for tracking robotic devices, and the multi-axis load cell 246 may be used for measuring forces and torques at the end-effector of the robotic arm 244, whereby complex load and displacement patterns may be generated and sensed using this system. An electromagnetically actuated robotic device 242 (occasionally referred to herein a "MMSBot") may be actuated and its performance determined under different load and displacement boundary conditions when interacting with the robotic arm 244 and the load cell 246.

Figure 22:
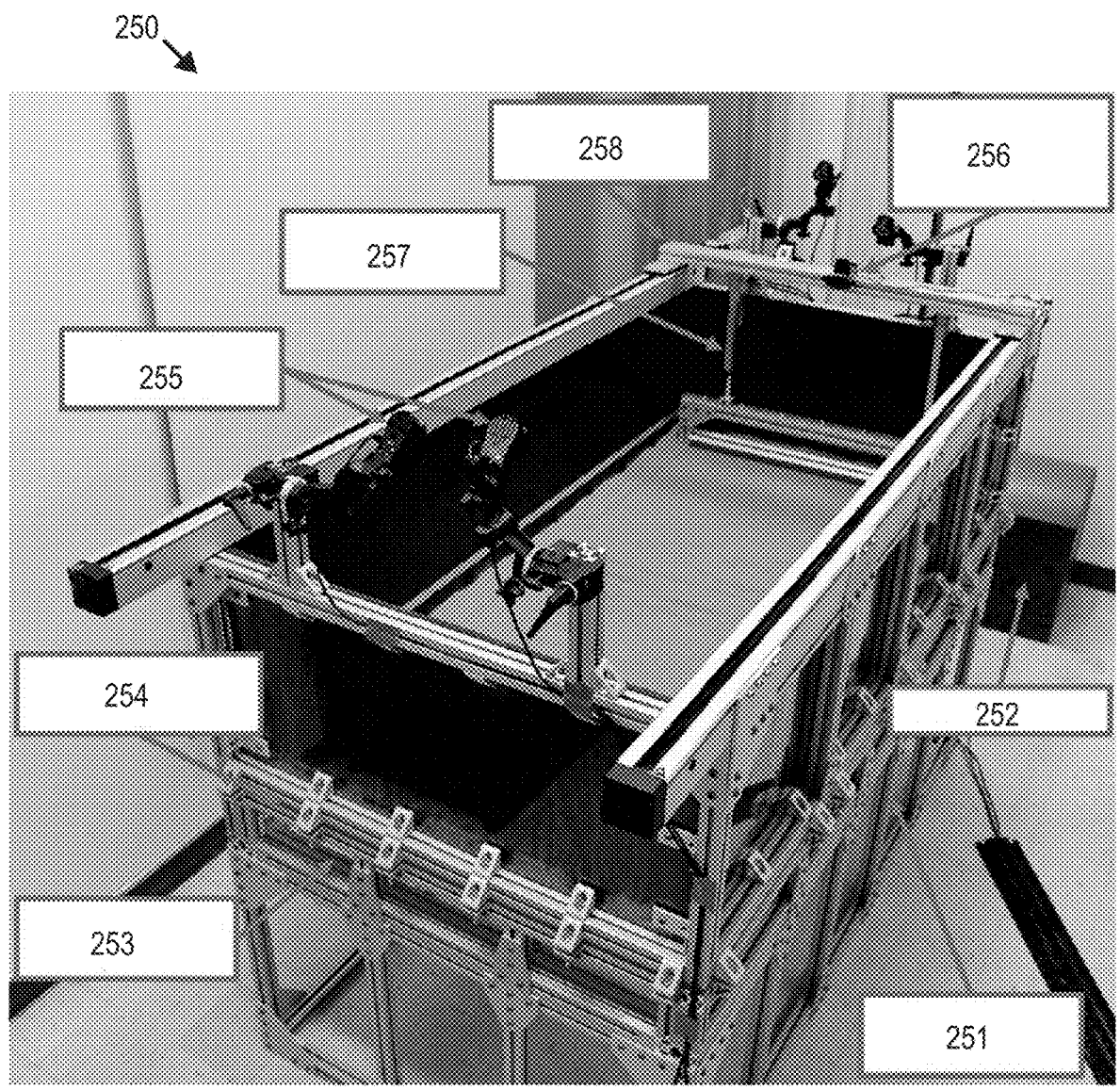
FIG. 22 is a schematic illustration of a testbed for performing locomotion tests for evaluating electromagnetically actuated robotic devices according to one or more embodiments.

FIG. 22 is a schematic illustration of a testbed 250 for performing locomotion tests for evaluating electromagnetically actuated robotic devices according to one or more embodiments. Flowable ground such as sand is a challenging terrain over which many state-of-the-art robots cannot traverse effectively. For rigorous locomotion tests on granular media, an air-fluidized bed may be used, such as of a size of 2 m×1 m to control material compactness (volume fraction) and inclination angle. These parameters have significant impacts on the reaction forces generated by the granular media. Additionally, obstacles of different sizes may be placed at randomized locations to explore the interactions between robotic devices with more complex and heterogeneous flowable terrain.

The testbed 250 of FIG. 22 includes bed tilting actuators 251, a fluidization fan 242, an air pocket/duct system 253, and a porous honeycomb layer 254. Additionally, high-speed infrared (IR) cameras 255 and a topology laser/camera scanning system 256 may be used for imaging. A surface scraper actuator system 257 may be arranged above the bed and may travel using a precision rail system 258.

With advances in computer vision and deep learning, it is feasible to precisely track multiple features on a morphing soft object. In certain embodiments, a testbed may use DeepLabCut, which is a pre-trained human pose algorithm trained on a large set of supervised data, to track an electromagnetically actuated robotic device. A solid state LiDAR depth camera such as an Intel RealSense LiDAR Camera L515 may be used for this purpose. Since shape-morphing robotic devices may not have distinct surface features to track and can also undergo substantial morphological changes, markers may be added to robotic devices according to certain embodiments.

FIGS. 23A-23B are photographs of an electromagnetically actuated robotic device resembling an octopus arm (or tentacle) in first and second actuation states, respectively, with the second actuation state being contracted relative to the first actuation state. The arm includes embedded magnetic actuators (e.g., coils) that enable bending, shortening, and extension. Magnetic coils may also be used for sensing arm deformation. Additionally, liquid metal-based pressure sensors may be printed along the arm to measure contact pressure.

FIG. 24 is a photograph showing a 3D print head 270 being used to fabricate a fish-shaped electromagnetically actuated robotic soft device 270 (shown in an incomplete state) comprising silicone rubber and resembling a fish.

FIGS. 25 and 26 are photographs of at least portions of electromagnetically actuated robotic soft devices 280A-280B each comprising a silicone rubber body structure 281A-281B and a conductive circuit 282A-282B (coupled with wires 283A-283B), produced by a 3D printing apparatus as described herein.

Those skilled in the art will recognize improvements and modifications to the preferred embodiments of the present disclosure. All such improvements and modifications are considered within the scope of the concepts disclosed herein and the claims that follow.

[i] D. Rus and M. T. Tolley. Design, fabrication and control of soft robots. Nature, 521(7553): 467, 2015.

[ii] Z. Peng and J. Huang. Soft rehabilitation and nursing-care robots: A review and future outlook. Applied Sciences, 9(15):3102, 2019.

[iii] H.-R. Lim, H. S. Kim, R. Qazi, Y.-T. Kwon, J.-W. Jeong, and W.-H. Yeo. Advanced soft materials, sensor integrations, and applications of wearable flexible hybrid electronics in healthcare, energy, and environment. Advanced Materials, page 1901924, 2019.

[iv] C. Walsh. Human-in-the-loop development of soft wearable robots. Nature Reviews Materials, 3(6):78-80, 2018.

[v] R. D. Maladen, Y. Ding, C. Li, and D. I. Goldman. Undulatory swimming in sand: subsurface locomotion of the sandfish lizard. science, 325(5938):314-318, 2009.

[vi] C. Li, S. T. Hsieh, and D. I. Goldman. Multi-functional foot use during running in the zebratailed lizard (*Callisaurus draconoides*). Journal of Experimental Biology, 215(18):3293-3308, 2012.

[vii] H. Marvi, C. Gong, N. Grayish, H. Astley, M. Travers, R. L. Hatton, J. R. Mendelson, H. Choset, D. L. Hu, and D. I. Goldman. Sidewinding with minimal slip: Snake and robot ascent of sandy slopes. Science, 346(6206):224-229, 2014.

[viii] M. Ilami, H. Bagheri, R. J. Ahmed, E. O. Skowronek, and H. Marvi. Bioinspired soft robots: Materials, sensors, and actuators. Advanced Materials, (In Press).

[ix] M. Ilami, R. J. Ahmed, D. Edwards, E. Thompson, S. Zeinolabedinzadeh, and H. Marvi. Magnetically actuated tunable soft electronics. ACS omega, 4(25):21242-21250, 2019.

[x] S. Belkhale, R. Li, G. Kahn, R. McAllister, R. Calandra, and S. Levine. Model-based metareinforcement learning for flight with suspended payloads, 2020.

[xi] W. Felt, M. J. Telleria, T. F. Allen, G. Hein, J. B. Pompa, K. Albert, and C. D. Remy. An inductance-based sensing system for bellows-driven continuum joints in soft robots. Autonomous robots, 43(2):435-448, 2019.

[xii] J. Z. Gul, M. Sajid, M. M. Rehman, G. U. Siddiqui, I. Shah, K.-H. Kim, J.-W. Lee, and K. H. Choi. 3d printing for soft robotics—a review. Science and Technology of advanced MaTerialS, 19(1):243-262, 2018.

[xiii] http://ninjatek.com/wp-content/uploads/2018/10/tech-data-metric.pdf

[xiv] O. D. Yirmibesoglu, J. Morrow, S. Walker, W. Gosrich, R. Ca˜nizares, H. Kim, U. Daalkhaijav, C. Fleming, C. Branyan, and Y. Menguc. Direct 3d printing of silicone elastomer soft robots and their performance comparison with molded counterparts. In 2018 IEEE International Conference on Soft Robotics (RoboSoft), pages 295-302. IEEE, 2018.

[xv] T.-P. Huynh, P. Sonar, and H. Haick. Advanced materials for use in soft self-healing devices. Advanced Materials, 29(19):1604973, 2017.

[xvi] E. Palleau, S. Reece, S. C. Desai, M. E. Smith, and M. D. Dickey. Self-healing stretchable wires for reconfigurable circuit wiring and 3d microfluidics. Advanced Materials, 25(11): 1589-1592, 2013.

[xvii] G. Li, X. Wu, and D.-W. Lee. Selectively plated stretchable liquid metal wires for transparent electronics. Sensors and Actuators B: Chemical, 221:1114-1119, 2015.

[xviii] N. Lu and D.-H. Kim. Flexible and stretchable electronics paving the way for soft robotics. Soft Robotics, 1(1):53-62, 2014.

[xix] C. Ladd, J.-H. So, J. Muth, and M. D. Dickey. 3d printing of free standing liquid metal microstructures. Advanced Materials, 25(36):5081-5085, 2013.

[xx] Yu, Y. F. Liu, R. Zhang, and J. Liu. Suspension 3d printing of liquid metal into self-healing hydrogel. Advanced Materials Technologies, 2(11):1700173, 2017.

[xxi] F. Liu, Y. Yu, L. Wang, L. Yi, J. Lu, B. Yuan, S. Tan, and J. Liu. 3d printing of flexible room-temperature liquid metal battery. arXiv preprint arXiv:1802.01655, 2017.

[xxii] P. F. Flowers, C. Reyes, S. Ye, M. J. Kim, and B. J. Wiley. 3d printing electronic components and circuits with conductive thermoplastic filament. Additive Manufacturing, 18:156-163, 2017.

[xxiii] Y. Kim, H. Yuk, R. Zhao, S. A. Chester, and X. Zhao. Printing ferromagnetic domains for untethered fast-transforming soft materials. Nature, 558(7709):274-279, 2018.

[xxiv] R. L. Truby, M. Wehner, A. K. Grosskopf, D. M. Vogt, S. G. Uzel, R. J. Wood, and J. A. Lewis. Soft somatosensitive actuators via embedded 3d printing. Advanced Materials, 30 (15):1706383, 2018.

[xxv] S. Abdollahi, A. Davis, J. H. Miller, and A. W. Feinberg. Expert-guided optimization for 3d printing of soft and liquid materials. PloS one, 13(4):e0194890, 2018.

[xxvi] O. D. Yirmibesoglu, J. Morrow, S. Walker, W. Gosrich, R. Ca˜nizares, H. Kim, U. Daalkhaijav, C. Fleming, C. Branyan, and Y. Menguc. Direct 3d printing of silicone elastomer soft robots and their performance comparison with molded counterparts. In 2018 IEEE International Conference on Soft Robotics (RoboSoft), pages 295-302. IEEE, 2018.

[xxvii] B. Shih, C. Christianson, K. Gillespie, S. Lee, J. Mayeda, Z. Huo, and M. T. Tolley. Design considerations for 3d printed, soft, multimaterial resistive sensors for soft robotics. Frontiers in Robotics and AI, 6:30, 2019.

[xxviii] A. Frutiger, J. T. Muth, D. M. Vogt, Y. Meng" uç, A. Campo, A. D. Valentine, C. J. Walsh, and J. A. Lewis. Capacitive soft strain sensors via multicore-shell fiber printing. Advanced Materials, 27(15):2440-2446, 2015.

[xxix] Y.-L. Park, B.-R. Chen, and R. J. Wood. Design and fabrication of soft artificial skin using embedded microchannels and liquid conductors. IEEE Sensors journal, 12(8):2711-2718, 2012.

[xxx] W. Felt, M. J. Telleria, T. F. Allen, G. Hein, J. B. Pompa, K. Albert, and C. D. Remy. An inductance-based sensing system for bellows-driven continuum joints in soft robots. Autonomous robots, 43(2):435-448, 2019.

[xxxi] J. D. Carrico, N. W. Traeden, M. Aureli, and K. K. Leang. Fused filament 3d printing of ionic polymer-metal composites (ipmcs). Smart Materials and Structures, 24(12):125021, 2015.

[xxxii] A. Chortos, E. Hajiesmaili, J. Morales, D. R. Clarke, and J. A. Lewis. 3d printing of interdigitated dielectric elastomer actuators. Advanced Functional Materials, 30(1): 1907375, 2020.

[xxxiii] A. T. Conn, M. J. Pearson, A. G. Pipe, J. Welsby, and J. Rossiter. Dielectric elastomer vibrissal system for active tactile sensing. In Electroactive Polymer Actuators and Devices (EAPAD) 2012, volume 8340, page 83400F. International Society for Optics and Photonics, 2012.

[xxxiv] M. Ilami, R. J. Ahmed, D. Edwards, E. Thompson, S. Zeinolabedinzadeh, and H. Marvi. Magnetically actuated tunable soft electronics. ACS omega, 4(25):21242-21250, 2019.

What is claimed is:

1. An electromagnetically actuated robotic device comprising:
   an elastomeric body structure;
   a plurality of electromagnetic coils arranged in or on the elastomeric body structure;
   at least one magnetically responsive element arranged in or on the elastomeric body structure, the at least one magnetically responsive element comprising at least one magnetically responsive core associated with one or more electromagnetic coils of the plurality of electromagnetic coils, the at least one magnetically responsive core comprising a ferrofluid;
   a tunable magnetic actuator comprising an electromagnetic coil of the one or more electromagnetic coils and the at least one magnetically responsive element positioned at least partially within the electromagnetic coil, the at least one magnetically responsive element movable relative to the electromagnetic coil to tune at least one electrical property of the tunable magnetic actuator;
   a pressure sensor separate from the plurality of electromagnetic coils and the at least one magnetically responsive element;
   a charge storage element arranged in or on the elastomeric body structure;
   at least one processor arranged in or on the elastomeric body structure; and
   a plurality of electrically conductive paths within the elastomeric body structure;
   wherein:
      the plurality of electrically conductive paths extend between the charge storage element, the at least one processor, and the plurality of electromagnetic coils; and
      at least one of (i) shape, (ii) gait, or (iii) electrical properties of the magnetically actuated robotic device is alterable by selective actuation of the one or more electromagnetic coils of the plurality of electromagnetic coils.

2. The device of claim 1, wherein the at least one magnetically responsive core further comprises an electrically conductive particulate material or a magnetically responsive polymer.

3. The device of claim 1, wherein two or more of (i) shape, (ii) gait, or (iii) electrical properties of the magnetically actuated robotic device is alterable by selective actuation of the one or more electromagnetic coils of the plurality of electromagnetic coils.

4. The device of claim 1, wherein each of (i) shape, (ii) gait, and (iii) electrical properties of the magnetically actuated robotic device is alterable by selective actuation of the one or more electromagnetic coils of the plurality of electromagnetic coils.

5. The device of claim 1, wherein the one or more electromagnetic coils comprises a first plurality of electromagnetic coils arranged in a first row, and comprises a second plurality of electromagnetic coils arranged in a second row.

6. The device of claim 1, wherein the elastomeric body structure comprises a plurality of fused dots, rods, or layers.

7. A method for fabricating an electromagnetically actuated robotic device, the method comprising:
   forming a first portion of an elastomeric body structure;
   providing a first plurality of electromagnetic coils in or on the first portion of the elastomeric body structure;
   providing at least one magnetically responsive element in or on the first portion of elastomeric body structure, the at least one magnetically responsive element comprising at least one magnetically responsive core associated with one or more electromagnetic coils of the plurality of electromagnetic coils, the at least one magnetically responsive core comprising a ferrofluid;
   providing a tunable magnetic actuator in or on the first portion of the elastomeric body structure, the tunable magnetic actuator comprising an electromagnetic coil of the one or more electromagnetic coils and the at least one magnetically responsive element positioned at least partially within the electromagnetic coil, the at least one magnetically responsive element movable relative to the electromagnetic coil to tune at least one electrical property of the tunable magnetic actuator;
   providing a pressure sensor in or on the elastomeric body structure, the pressure sensor separate from the plurality of electromagnetic coils and the at least one magnetically responsive element;
   depositing conductive material in or on the first portion of the elastomeric body structure to provide a first plurality of conductive paths coupled with the first plurality of magnetic coils;
   forming a second portion of the elastomeric body structure;
   providing at least one processor in or on the first portion and/or the second portion of the elastomeric body structure, and coupling the at least one processor with at least one conductive path of the first plurality of conductive paths; and providing a charge storage element in or on the first portion and/or the second portion of the elastomeric body structure, and coupling the charge storage element with at least one conductive path of the first plurality of conductive paths;

wherein at least one of (i) shape, (ii) gait, or (iii) electrical properties of the magnetically actuated robotic device may be altered by selective actuation of the one or more electromagnetic coils of the plurality of electromagnetic coils.

8. The method of claim 7, further comprising:

providing a second plurality of electromagnetic coils in or on the second portion of the elastomeric body structure;

depositing conductive material in or on the second portion of the elastomeric body structure to provide a second plurality of conductive paths coupled with the second plurality of magnetic coils;

coupling the at least one processor with at least one conductive path of the second plurality of conductive paths; and coupling the charge storage element with at least one conductive path of the second plurality of conductive paths.

9. The method of claim 7, wherein the forming of one or more of the first portion of the elastomeric body structure or the forming of the second portion of the elastomeric body structure comprises three-dimensional printing.

10. The method of claim 7, wherein the forming of one or more of the first portion of the elastomeric body structure or the forming of the second portion of the elastomeric body structure comprises molding.

11. The method of claim 7, wherein the depositing of conductive material in or on the first portion of the elastomeric body structure comprises three-dimensional printing.

12. The method of claim 7, wherein the providing of the first plurality of electromagnetic coils in or on the first portion of the elastomeric body structure comprises three-dimensional printing.

13. The method of claim 7, wherein for at least one electromagnetic coil of the plurality of electromagnetic coils, the method further comprises forming a magnetically responsive core associated with the at least one electromagnetic coil.

14. The method of claim 13, wherein for the at least one electromagnetic coil, the magnetically responsive core comprises an electrically conductive particulate material or a magnetically responsive polymer.

* * * * *